(12) United States Patent
Fukumoto et al.

(10) Patent No.: US 6,320,497 B1
(45) Date of Patent: Nov. 20, 2001

(54) DISPLAY CONTROL SYSTEM FOR A WORKING VEHICLE

(75) Inventors: Toshiya Fukumoto, Sakai; Shohei Nakai, Izumi, both of (JP)

(73) Assignee: Kubota Corporation (JP)

( * ) Notice: Subject to any disclaimer, the term of this patent is extended or adjusted under 35 U.S.C. 154(b) by 0 days.

(21) Appl. No.: 09/511,808

(22) Filed: Feb. 24, 2000

(30) Foreign Application Priority Data

Jul. 27, 1999 (JP) .................................................. 11-212334

(51) Int. Cl.[7] ...................................................... B60Q 1/00
(52) U.S. Cl. ...................... 340/425.5; 340/438; 340/459; 701/35; 702/183
(58) Field of Search ................................ 340/425.5, 438, 340/459, 10.41; 701/35, 31, 29, 36, 33, 3; 702/130, 183, 185

(56) References Cited

U.S. PATENT DOCUMENTS

| 4,109,235 | 8/1978 | Bouthors ............................... 340/461 |
| 5,063,513 | * 11/1991 | Shank et al. ............................ 701/36 |
| 5,880,710 | * 3/1999 | Jaberi et al. ........................... 345/117 |
| 5,884,243 | * 3/1999 | Taniguchi et al. ..................... 702/183 |
| 5,949,330 | * 9/1999 | Hoffman et al. ...................... 340/438 |
| 6,006,146 | * 12/1999 | Usui et al. .............................. 701/29 |
| 6,112,150 | * 8/2000 | Irons et al. ............................ 701/114 |
| 6,134,488 | * 10/2000 | Sasaki et al. ........................... 701/31 |

FOREIGN PATENT DOCUMENTS

| 0416171A2 | 3/1991 | (EP) . |
| 1120508 | 1/1999 | (JP) . |
| H5338467 | 2/1993 | (JP) ............................... B60K/35/00 |
| S5826652 | 2/1983 | (JP) ............................... B60Q/9/00 |
| H789387 | 4/1995 | (JP) ................................ B60Q/9/00 |
| S6239716 | 2/1987 | (JP) ................................ G01D/7/00 |
| H744222 | 2/1995 | (JP) ............................... G05B/23/02 |
| 9204693 | 3/1992 | (WO) . |

OTHER PUBLICATIONS

Partial Translation of Japanese Patent Laying-open Publication S58-26652, 1 page.
Partial Translation of Japanese Patent Laying-open Publication S62-39716, 1 page.
Partial Translation of Japanese Patent Laying-open Publication H7-44222, 2 page.
Partial Translation of Japanese Patent Laying-open Publication H7-89387, 1 page.
Partial Translation of Japanese Patent Laying-open Publication H5-338467, 1 page.

* cited by examiner

*Primary Examiner*—Edward Lefkowitz
*Assistant Examiner*—Davetta W. Goins
(74) *Attorney, Agent, or Firm*—Webb Ziesenheim Logdson Orkin & Hanson, P.C.

(57) ABSTRACT

A display control system for a working vehicle comprising a plurality of sensors arranged on a vehicle body, a display for displaying messages relating to various information, and a display controller operable in response to information from the sensors for selecting information to be displayed on the display. The display controller has an ordinary display mode for displaying, on the display during an operation, information necessary to the operation, an adjusting mode for displaying, on the display during a non-operating time, information for correcting signals from the sensors, and a diagnostic mode for displaying, on the display during a non-operating time, information for checking the signals from the sensors. The system includes a display mode selecting device for selecting one of the three display modes according to a state of the working vehicle.

11 Claims, 19 Drawing Sheets

Fig.13
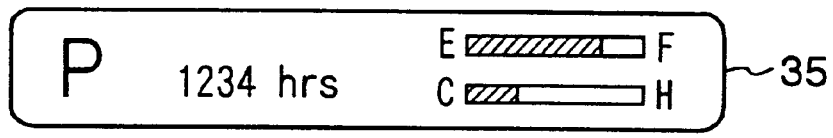
or
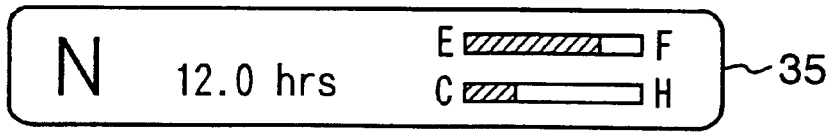
or
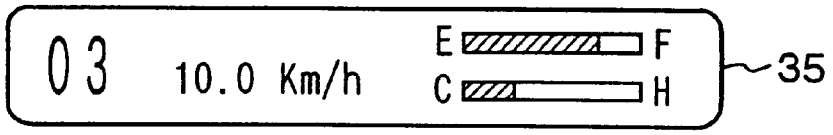
Fig.14
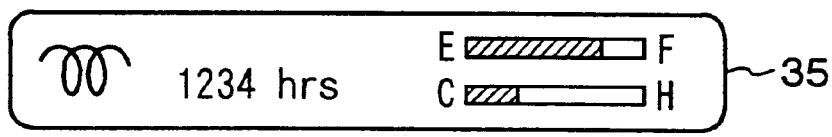
or
or

DISPLAY CONTROL SYSTEM FOR A WORKING VEHICLE

BACKGROUND OF THE INVENTION

1. Field of the Invention

This invention relates to a display control system for a working vehicle having a plurality of sensors arranged on a vehicle body, a display for displaying messages on various information, and a display control device for selecting information to be displayed on the display based on information from the sensors.

2. Description of the Related Art

Techniques relating to a working vehicle having a display as noted above are disclosed in Japanese Patent Laying-Open Publications S58-26652 and S62-39716, for example. In these publications, plural types of information are displayed on one display. In the former publication, vehicle running information and alarm items are switchable for display. In the latter publication, an inspection image is displayed before an engine start, and vehicle running information after the engine start.

Taking an agricultural tractor for an example of working vehicles, one developed in recent years performs not only a lift control and rolling control of a plow, but various other controls such as a change speed control of front wheels based on a steering wheel operation and a braking control of rear wheels based on a steering wheel operation. The sensors required for the lift control of the plow, for example, may include a setter for setting a target height of the plow relative to the tractor body, a sensor for measuring a pivoting angle of a rear cover, and a sensor for measuring a height of the plow relative to the tractor body. To perform these lift controls smoothly, a conventional tractor further includes an engine speed sensor to correct the controls based on an engine speed. It is important for the display to keep displaying information on a quantity of fuel needed in time of an operation, and on a temperature of engine cooling water. In addition, the technique as disclosed in the former of the above prior art publications is useful, when a normal operation cannot be performed, to utilize the display for allowing the operator to promptly recognize the situation. The technique as disclosed in the latter prior art publication is also useful to utilize the display in inspecting and adjusting the sensors arranged on the tractor body.

The prior art noted above facilitates maintenance and inspection of the numerous sensors arranged on the tractor body, in that whether the sensors are normal or abnormal may be determined on the display screen based on the signals from the sensors. However, the display cannot be used to the extent of correcting values of the signals from the sensors. In this sense, there is room for improvement. Particularly, it is unsatisfactory that an inspection image (safety monitor screen) is always displayed immediately before an engine start, and that too many pieces of information displayed are difficult to discern.

SUMMARY OF THE INVENTION

An object of this invention is to provide a display control system for making effective use of a display disposed on a vehicle body to display various information necessary to operations, and for allowing the operator, by using this display, to grasp and check, without difficulty, conditions of numerous sensors arranged on the vehicle body.

The above object is fulfilled, according to this invention, by a display control system for a working vehicle comprising a plurality of sensors arranged on a vehicle body; a display for displaying messages relating to various information; a display controller operable in response to information from the sensors for selecting information to be displayed on the display, wherein the display controller has an ordinary display mode for displaying, on the display during an operation, information necessary to the operation, an adjusting mode for displaying, on the display during a non-operating time, information for correcting signals from the sensors, and a diagnostic mode for displaying, on the display during a non-operating time, information for checking the signals from the sensors; and a display mode selecting device for selecting one of the three display modes according to a state of the working vehicle.

With this construction, during an operation, displays are made in the ordinary display mode for the operator to obtain information necessary to the operation from the display. When correcting signals from the sensors in a non-operation time, necessary information may be obtained from the display in the adjusting mode. When checking the signals from the sensors in a non-operation time, necessary information may be obtained from the display in the diagnostic mode.

In one preferred embodiment of this invention, in the ordinary display mode, at least one of remaining fuel information and engine cooling water temperature information is displayed as a standard display on the display; and when the sensors detect an abnormality in time of the standard display, the standard display is overridden by messages corresponding to the abnormality to be displayed as an alarm display on the display. With this construction, when an operation is carried out with displays made in the ordinary display mode, the operator may obtain from the display at least one of the remaining fuel information and engine cooling water temperature information displayed as a standard display. When the sensors detect an abnormality, the standard display is overridden by the alarm display to be shown on the display. Based on the alarm display, the operator may take appropriate action to deal with the abnormally.

In another preferred embodiment, in the adjusting mode, messages for operations to be carried out by an operator are displayed on the display, and in the diagnostic mode, information on the sensors diagnosed is displayed on the display. Thus, in the adjusting mode, the operator may carried out a proper operation based on the messages appearing on the display. In the diagnosis mode, states of the sensors may be determined reliably from the information on the sensors shown on the display.

In a further preferred embodiment, in the adjusting mode, messages for plural types of operations to be carried out by the operator are displayed in a predetermined order on the display, the messages being excluded after the operations are determined to have been carried out properly, based on signals from the sensors, and the messages being displayed again when the operations are determined not to have been carried out properly, based on signals from the sensors. Thus, in the adjusting mode, the operator may carried out an operation based on the messages appearing on the display, and the same messages are not displayed after a proper operation are carried out. When an operation cannot be carried out as indicated by the messages or an improper operation is carried out, the same messages are displayed again for the operator to carry out an operation according to the display. A necessary operation may be carried out properly since the messages are displayed until this is done.

In a further preferred embodiment, in the diagnostic mode, when a signal from one of the sensors diagnosed shows an abnormal value, a message indicating the one of the sensors diagnosed to be abnormal or a signal value from the one of the sensors is displayed on the display. Thus, in the diagnosis mode, when one of the sensors diagnosed shows an abnormal value, the state of the sensor may be determined with ease.

In a further preferred embodiment, one of the adjusting mode and the diagnostic mode is selectable by operating an engine starting switch to a power supply position with a plurality of working switches turned on. With this construction, to set the display to the adjusting mode or diagnosis mode, the engine starting switch must first be operated to the power supply position in a way not performed in time of usual engine starting. The display controls in the adjust mode or diagnostic mode never take place in time of an ordinary operation. One of the adjusting mode and diagnosis mode may be selected only when the operator intends to do so.

As described above, the display control system according to this invention utilizes the display disposed on the vehicle body to show various information necessary to an operation. In addition, the operator may grasp and check the states of the numerous sensors disposed on the vehicle body. Further, the operator may confirm what is shown on the display during an operation. When an abnormality occurs, the operator may immediately take steps to eliminate the abnormality based on the information shown on the display. The operator may adjust the sensors properly, based on information shown on the display, without referring to manuals. When checking the sensors, the operator may readily grasp correct information shown on the display 35, to make adjustment or determine whether certain sensors need to be changed. Although the engine starting switch is used to start the adjusting mode and diagnostic mode, the displays in the adjust mode or diagnostic mode never take place when the engine is started for an actual operation. Thus, the operator is free from troublesomeness concerning the display.

Other features and advantages of this invention will be apparent from the following description of the embodiments to be taken with reference to the drawings.

BRIEF DESCRIPTION OF THE DRAWINGS

FIG. 13 is a view showing three types of standard display;

FIG. 14 is a view showing three types of display made in time of engine starting;

DESCRIPTION OF THE PREFERRED EMBODIMENTS

Embodiments of this invention will be described hereinafter with reference to the drawings.

Figure 1:
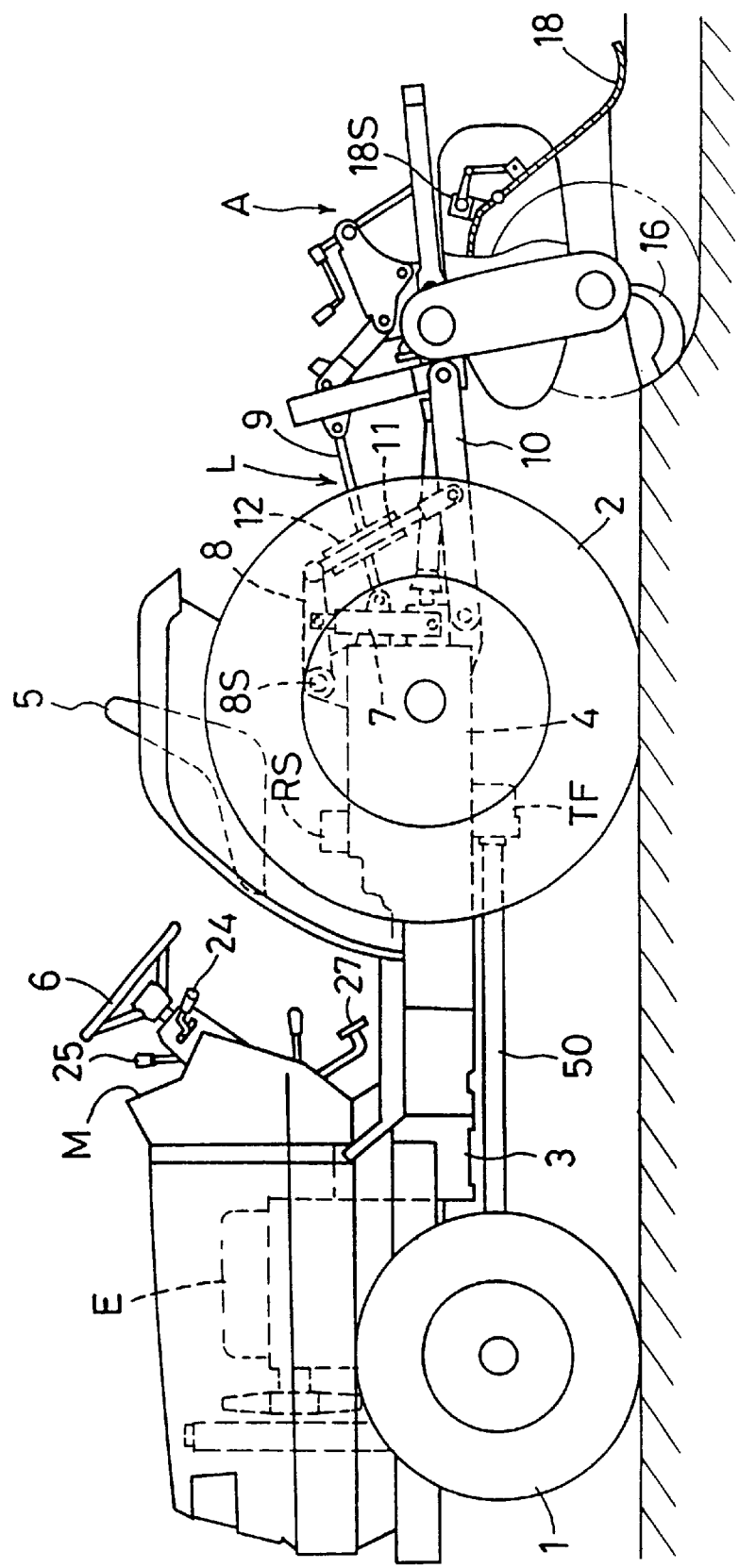
FIG. 1 is a side elevation of an agricultural tractor.
Figure 2:
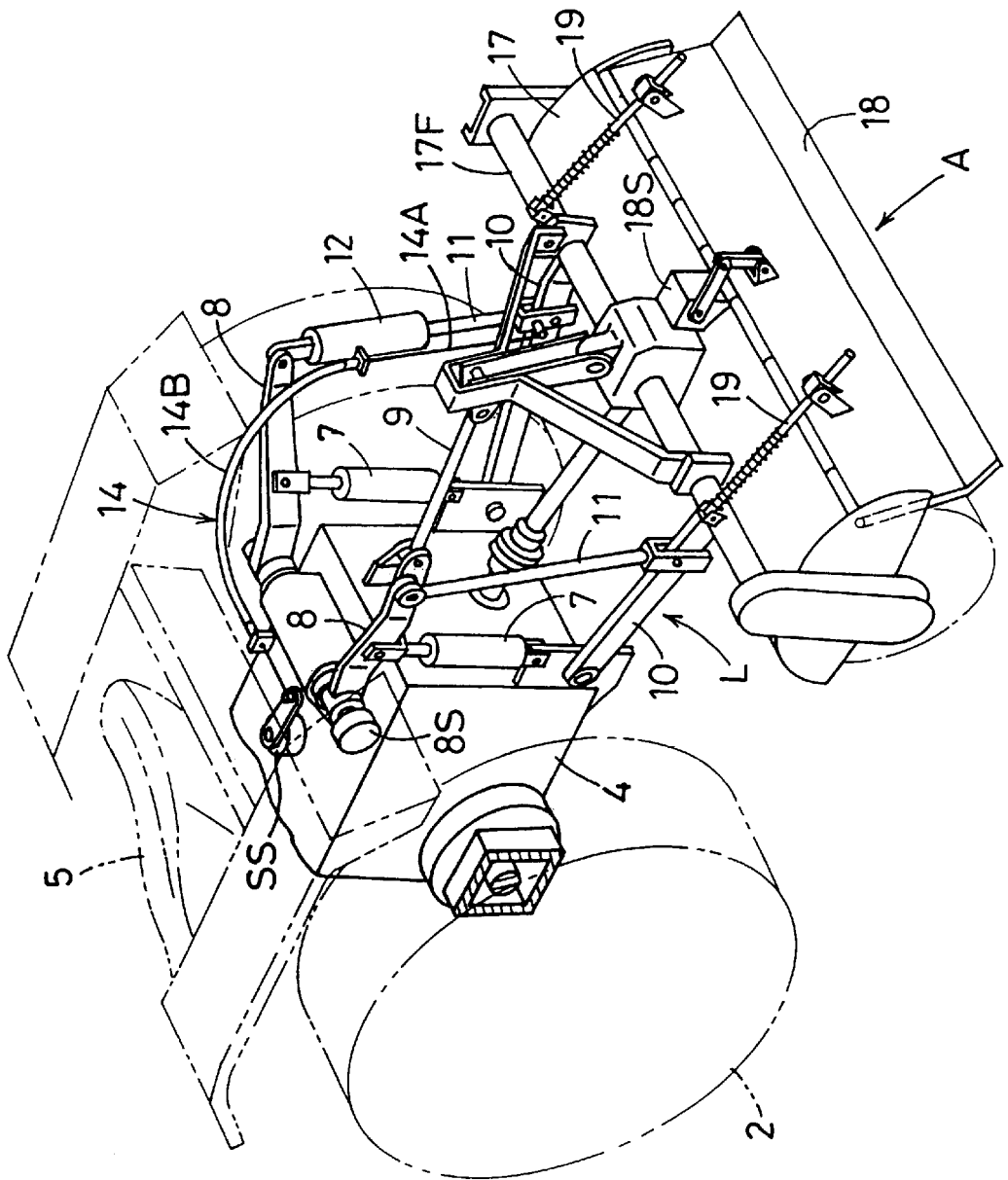
FIG. 2 is a perspective view of a rear portion of the agricultural tractor.

As shown in FIGS. 1 and 2, an agricultural tractor, which is one example of working vehicles, has dirigible front drive wheels 1 and rear drive wheels 2 for supporting a tractor body. An engine E is mounted on a front portion of the tractor body. Power of engine E is transmitted through a main clutch 3 to a transmission case 4 disposed to extend from a middle portion to a rear portion of the tractor body. A driver's seat 5 and a steering wheel 6 are arranged centrally of the tractor body. The transmission case 4 supports, in rear end positions thereof, a pair of right and left hydraulic lift cylinders 7 extending vertically for raising and lowering a pair of right and left lift arms 8. Through a three point link mechanism L vertically movable by these lift arms 8, a rotary plow A is coupled to the rear end of the tractor body.

The three point link mechanism L includes a top link 9 disposed in an upper rear end position of the tractor body, and a pair of right and left lower links 10 arranged at opposite rear sides of the tractor body. The right and left lower links 10 and right and left lift arms 8 are supported in suspension through lift rods 11. The rotary plow A is vertically movable with pivotal movement of lift arms 8. A lift arm sensor 8S of the potentiometer type is provided for measuring an amount of pivotal movement of lift arms 8. One of the lift rods 11 has a hydraulic, double-acting, rolling cylinder 12 extendible and contractable for allowing a free rolling motion of rotary plow A. A rolling sensor RS of the potentiometer type is mounted in a rearward position of the tractor body for measuring a rolling of the tractor body. To measure an amount of operation of rolling cylinder 12, a sensor wire 14 supporting an inner wire 14A and an outer wire 14B is connected to an extension and contraction portion of rolling cylinder 12, and a rotatable stroke sensor SS of the potentiometer type is connected to the other end of sensor wire 14 to be operable by the sensor wire 14.

As shown in FIGS. 1, 2 and 6, the rotary plow A includes numerous tines 16 rotatable about a drive shaft extending transversely of the plow, and a rear cover 18 attached to a rear position of a main plow body 17 to be pivotable about a transverse axis. Rods 19 pivotally connected to the rear cover 18 extend to outer positions of a frame 17F of main plow body 17, with compression springs applying a downward biasing force to the rear cover 18. Support positions between the rods 19 and rear cover 18 may be varied to fix the rear cover 18 to a raised state. A cover sensor 18S is mounted on an upper surface of the main plow body for measuring an amount of pivotal movement of the cover 18.

Figure 3:
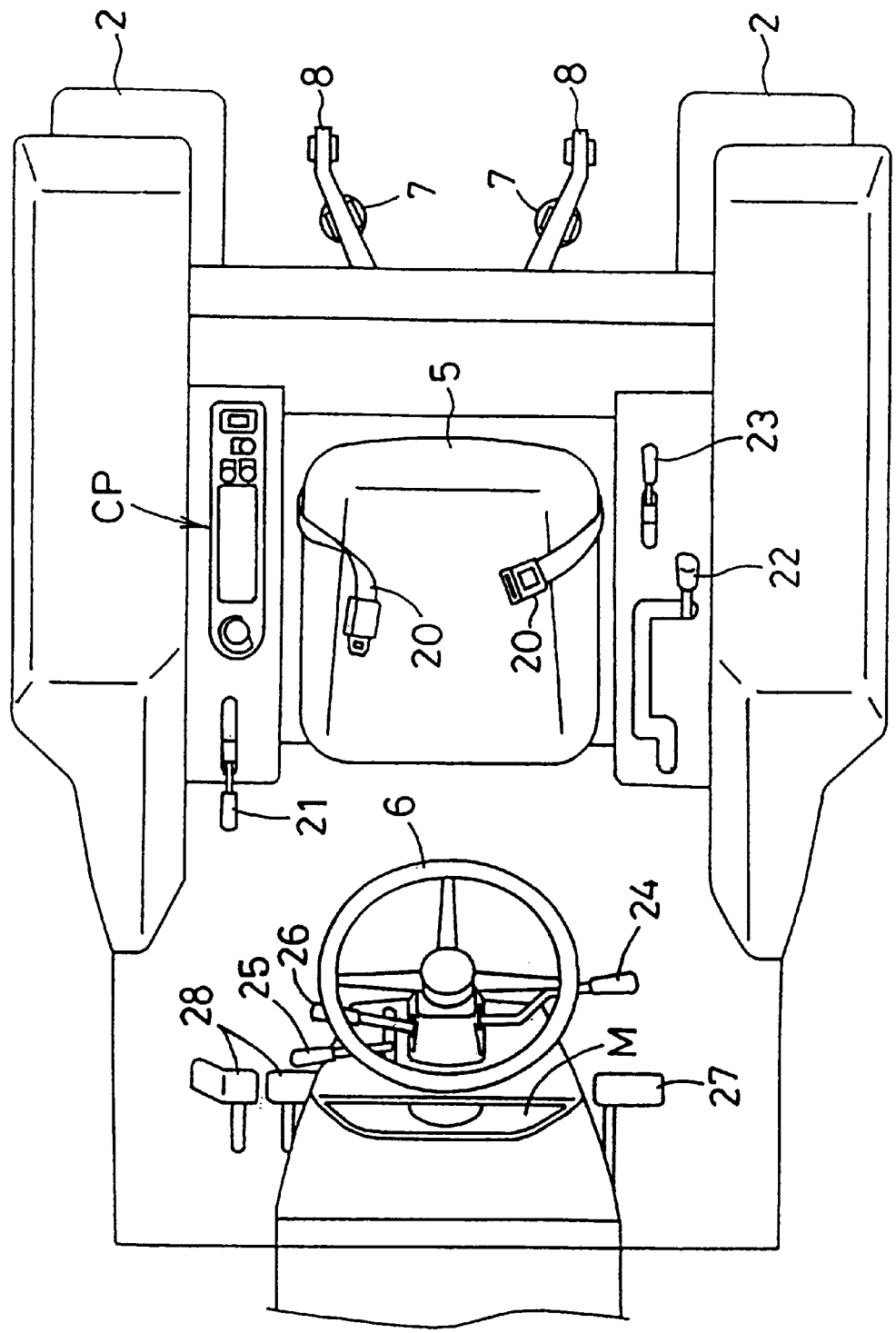
FIG. 3 is a plan view of a rear portion of the agricultural tractor.
Figure 10:
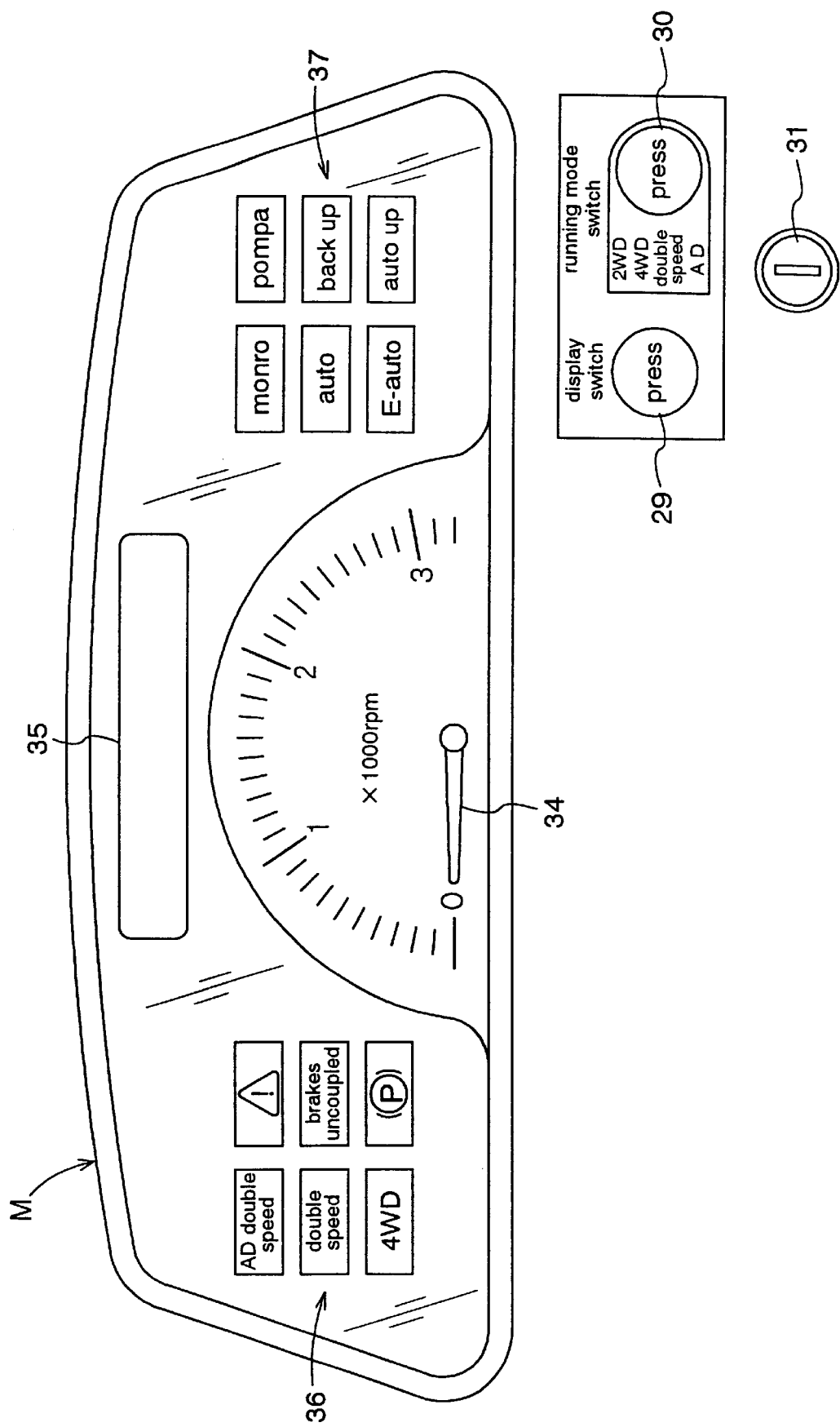
FIG. 10 is a view showing an arrangement of a meter section and switches.

Referring to FIGS. 3 and 10, the driver's seat 5 has connectable and disconnectable, right and left seat belt straps 20. At the right side of driver's seat 5 are a control panel CP, and a position lever 21 for adjusting a pivoting angle of lift arms 8 to control raising and lowering of rotary plow A. At the left side of driver's seat 5 are a main shift lever 22 and a creep shift lever 23 for setting running speeds. A backward and forward drive change lever 24 is disposed at the left side of steering wheel 6 to be pivotable longitudinally of the tractor body. An accelerator lever 25 and a forcible lift lever 26 are arranged at the right side of the steering wheel. A main clutch pedal 27 is disposed at the left side on a floor to be depressible to disengage the main clutch 3. Side brake pedals 28 are disposed at the right side on the floor to be depressible to brake the right and left rear wheels 2 independently of each other. A panel disposed forwardly of steering wheel 6 includes a meter section M, a display select switch 29, a running mode select switch 30 and a key switch 31. The select switch may be pressed to select one of four modes which are "2WD", "4WD", "double-speed" and "AD double-speed".

Controls in the four modes of "2WD", "4WD", "double-speed" and "AD double-speed" will be described later. In the "2WD" mode, drive transmission to the front wheels 1 is disconnected to cause the tractor to run only by the drive of rear wheels 2. In the "4WD" mode, the tractor is driven by both front and rear wheels, with drive transmitted to the front wheels 1 to rotate at the same peripheral speed as the rear wheels 2 (i.e. standard drive state). In the "double-speed" mode, a switch is made from the standard "4WD" mode to a drive mode for increasing the driving speed of front wheels 1, when the front wheels 1 are steered by a larger angle than a predetermined steering angle, to cause the tractor to make a turn by a small radius. In the "AD double-speed" mode, a switch is made from the standard "4WD" mode to a drive mode for increasing the driving speed of front wheels 1 and at the same time braking an inward one of the rear wheels 2, when the front wheels 1 are steered by a larger angle than a predetermined steering angle, to cause the tractor to make a turn by a still smaller radius.

As shown in FIG. 10, the meter section M includes a pointer type, engine speed meter 34 disposed centrally thereof, a liquid crystal display 35 disposed above, a status area 36 with a plurality of indicator lamps to the left, and a display area 37 to the right having display lamps for indicating operating modes.

Specifically, the status area 36 includes a lamp marked with a sign indicating an alarm state, a lamp with characters "brakes uncoupled" indicating that couplings (not shown) for interconnecting the side brake pedals 28 are released. a lamp with letter "P" indicating that a parking brake is on, a lamp with characters "AD double-speed" indicating that the "AD double-speed" has been selected, a lamp with characters "double-speed" indicating that the "double-speed" has been selected, and a lamp with characters "4WD" indicating that the tractor is in the four-wheel drive mode. The display area 37 includes a lamp with characters "monro" indicating that the rotary plow A is under rolling control, a lamp with characters "auto" indicating an operative state of a lift control relative to the ground using the cover sensor 18S, a lamp with characters "E auto" indicating that a vertical position of rotary plow A is controlled based on variations in the speed of engine E, a lamp with characters "pompa" indicating a lift control based on operation of the forcible lift lever 26, a lamp with characters "back up" indicating that a control is effected to raise the rotary plow A to a predetermined height automatically when the tractor is driven backward, and a lamp with characters "auto up" indicating that a control is effected to raise the rotary plow A to a predetermined height when the front wheels 1 are steered more than a predetermined angle.

Figure 5:
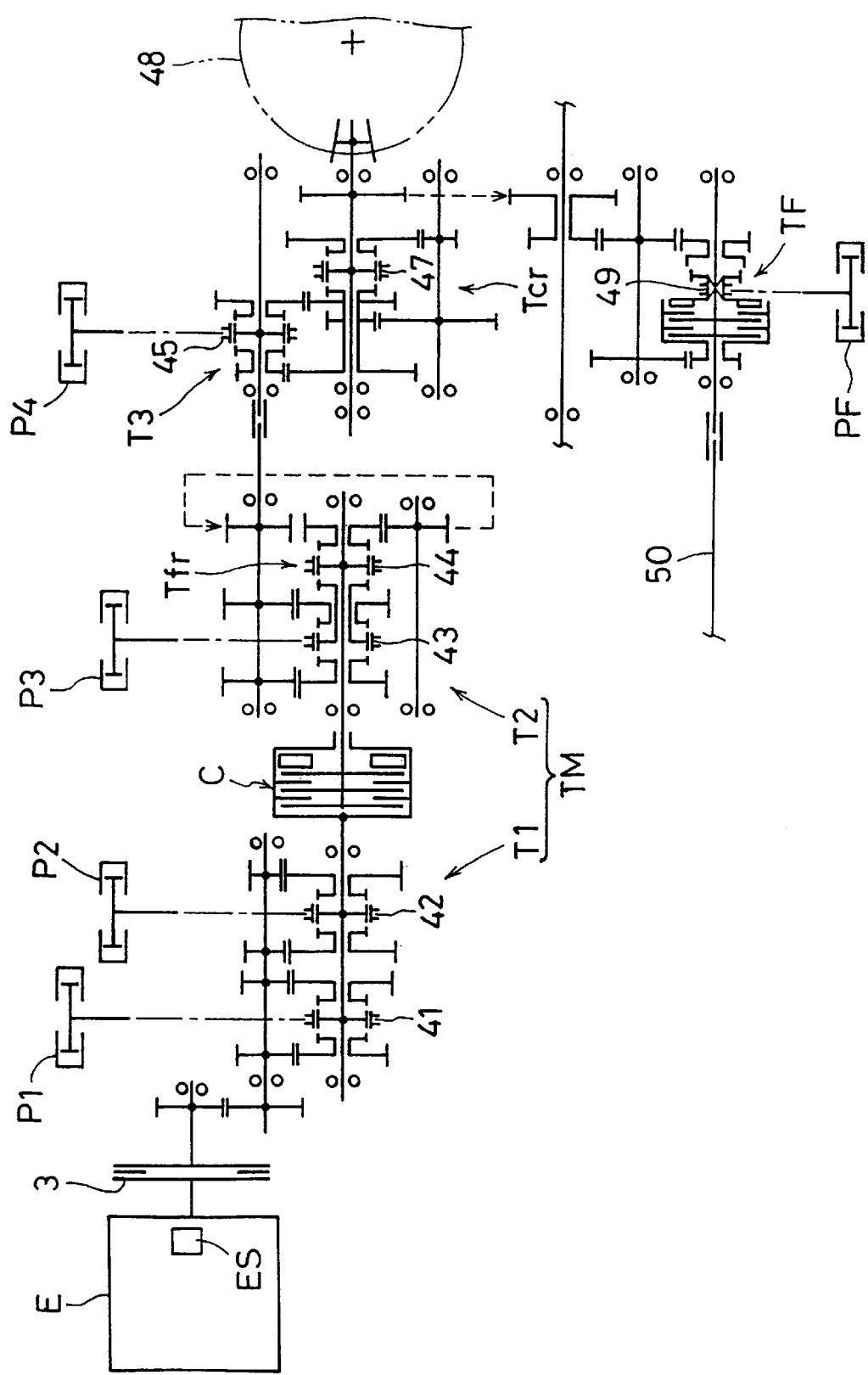
FIG. 5 is a schematic view of a change speed system inside a transmission case.

The transmission case 4 houses a transmission system as shown in FIG. 5. Specifically, the transmission system includes a first change speed mechanism T1 having a four sets of gears and two sets of shifters 41 and 42 of the synchromesh type for changing the power transmitted from engine E through main clutch 3 into four speeds, a hydraulic clutch C disposed downstream of the first change speed mechanism T1, a second change speed mechanism T2 disposed downstream of the hydraulic clutch C and having two sets of gears and a shifter 43 of the synchromesh type for changing the power into two speeds, a backward and forward drive switching mechanism Tfr having a reversing gear line and one shifter 44 of the synchromesh type for transmitting the power from the second change speed mechanism T2 in forward rotation or backward rotation, a third change speed mechanism T3 disposed downstream of the backward and forward drive switching mechanism Tfr and having two sets of gears and one shifter 45 of the synchromesh type for changing the power into two speeds, and a creep change speed mechanism Tcr disposed downstream of the third change speed mechanism T3 and having one set of gears and a shifter 47 of the constant mesh type for transmitting the power received from the third change speed mechanism T3 as it is or in a substantially decelerated state.

A propelling transmission system is constructed to transmit the power from this transmission system to the rear wheels 2 through a rear differential 48, and to the front wheels 1 through a front wheel change speed device TF and a front wheel drive shaft 50. The front wheel change speed device is operable by a shifter 49 to selectively provide the standard drive state for driving the front wheels 1 at the same peripheral speed as the rear wheels 2, an accelerating state for driving the front wheels 1 at a higher peripheral speed than the rear wheels 2, and a state for disconnecting the power transmission to the front wheels 1. The front wheel accelerating device TF has functions to transmit accelerated drive to the front wheels 1 when, in the "double-speed" mode and "AD double-speed" mode, the front wheels 1 are steered by a larger angle than a predetermined steering angle.

The first change speed mechanism T1 and second change speed mechanism T2 constitute a main change speed device TM for providing eight forward traveling speeds. The main change speed device TM has a first hydraulic cylinder P1, a second hydraulic cylinder P2 and a third hydraulic cylinder P3 for operating the three shifters 41, 42 and 43, respectively. The shifter 44 of the backward and forward drive switching mechanism Tfr mechanically interlocked to the backward and forward drive change lever 24. The third change speed mechanism T3 has a fourth hydraulic cylinder P4 for operating the shifter 45. The shifter 47 of the creep change speed mechanism Tcr is interlocked to the creep shift lever 23.

Figure 7:
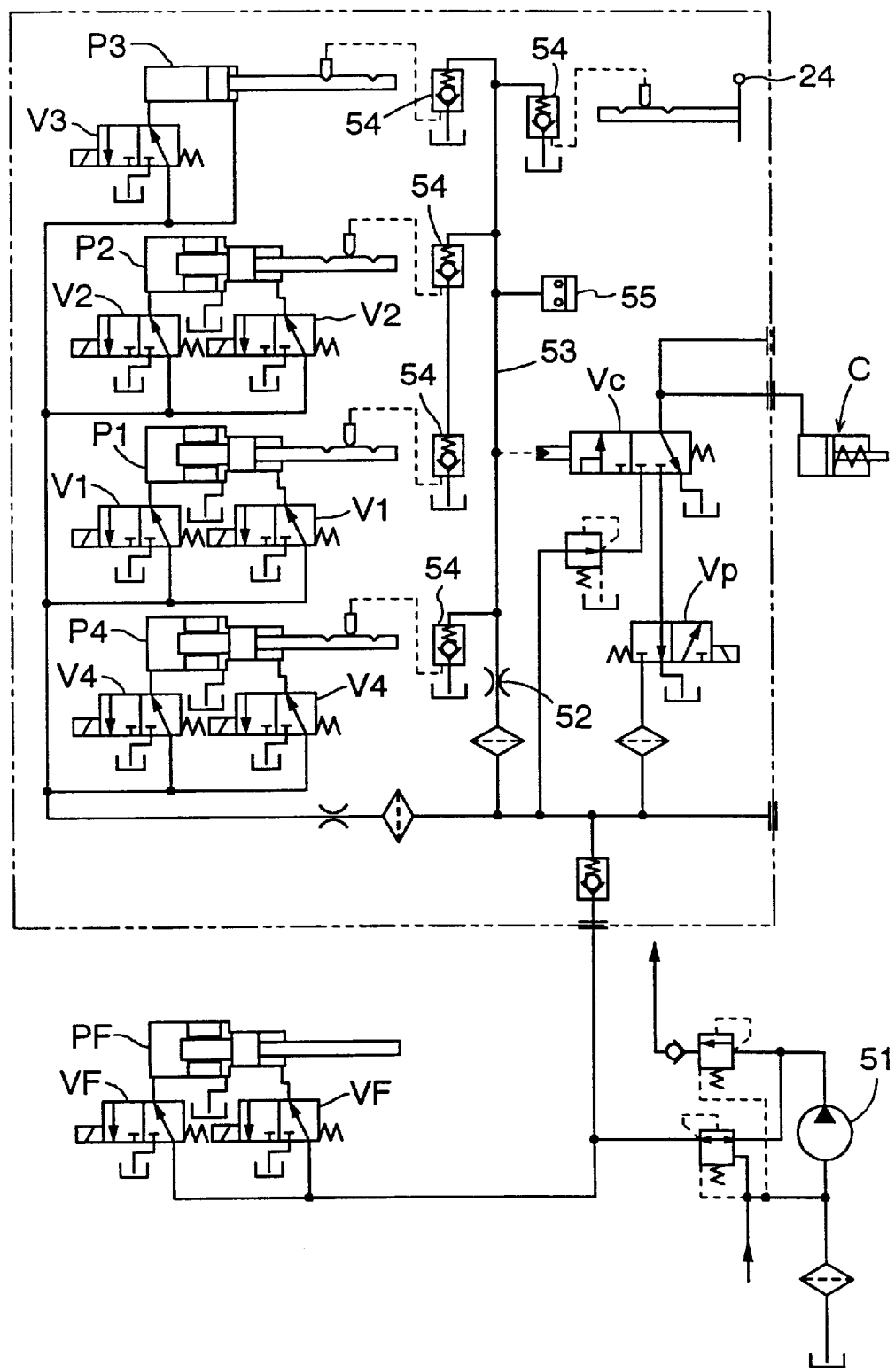
FIG. 7 is a hydraulic circuit diagram for the change speed system.

As shown in FIG. 7, a hydraulic system is constructed for controlling the respective hydraulic cylinders P1–P4 and hydraulic clutch C. The first, second and fourth hydraulic cylinders P1, P2 and P4 are double-acting cylinders for setting the shifters 41, 42 and 45 to control positions at opposite ends and to a neutral position. The third hydraulic cylinder P3 is a double-acting cylinder for setting the shifter 43 to control positions at opposite ends. These hydraulic cylinders P1, P2, P3 and P4 are controllable by seven electromagnetic cylinder control valves V1, V2, V3 and V4 which receive hydraulic oil from a hydraulic pump 51 driven by the engine E. An oil line is formed for supplying hydraulic oil from the hydraulic pump 51 to the hydraulic clutch C through a pilot operated switch valve Vc. An oil line is also formed to adjusts pressure with an electromagnetic proportional pressure control valve Vp when the hydraulic clutch C is engaged. Further, hydraulic oil is supplied through an orifice 52 to a pilot oil line 53. In addition, an oil line is provided to operate the switch valve Vc with a pressure in the pilot oil line 53. Oil lines are also provided to reduce the pressure to the pilot oil line 53 through five check valves 54. Four of the five check valves 54 are mechanically operable when operating the hydraulic cylinders P1, P2, P3 and P4. The remaining one check valve 54 is interlocked to be operable when the backward and forward drive change lever 24 is operated. The pilot oil line 53 has a pressure sensor 55.

When each of the first, second and fourth double-acting hydraulic cylinders P1, P2 and P4 receives hydraulic oil simultaneously from the two control valves, the piston in the cylinder is placed in a neutral position. When hydraulic oil is supplied from one control valve, the piston is moved to one end. When hydraulic oil is supplied from the other control valve, the piston is moved to the other end.

Upon start of an operation of each hydraulic cylinder P1, P2, P3 or P4, the corresponding check valve 54 is opened to reduce the pressure in the pilot oil line 53, whereby the switch valve Vc is operated to a drain position to disengage the hydraulic clutch C. In this way, the hydraulic cylinder is operable to effect a shifting operation in a timed relationship with disengagement of the hydraulic clutch C. Subsequently, upon completion of the operation of the hydraulic cylinder, the check valve 54 is closed again to operate the switch valve Vc to an oil supplying position. As a result, hydraulic oil is supplied to the hydraulic clutch C with the pressure adjusted by the control valve Vp to engage the hydraulic clutch C. Thus, a shifting operation is carried out without requiring the main clutch 3 to be manually disengaged.

Similarly, when the backward and forward drive change lever 24 is operated, the corresponding check valve 54 is opened to reduce the pressure in the pilot oil line 53, whereby the switch valve Vc is operated to the drain position to disengage the hydraulic clutch C to allow a drive switching. Subsequently, upon completion of the operation of the backward and forward drive change lever 24, the check valve 54 is closed again to operate the switch valve Vc to the oil supplying position. As a result, hydraulic oil is supplied to the hydraulic clutch C with the pressure adjusted by the control valve Vp to engage the hydraulic clutch C. When the above change operation is carried out, the pressure in the pilot oil line 53 increases again after being reduced. When such pressure variations are detected by the pressure sensor 55 of the electric switch type, a controller (described later) adjusts a current applied to an electromagnetic solenoid of the control valve Vp. In this way, the pressure to the hydraulic clutch C is increased while adjusting the pressure of hydraulic oil supplied to the hydraulic clutch C according to predetermined characteristics, to engage the clutch smoothly without generating a shock.

A shift cylinder PF is provided for operating the shifter 49 of front wheel change speed device TF. This shift cylinder PF is a double acting cylinder, as is the first hydraulic cylinder P1, for setting the shifter 49 to control positions at opposite ends and to a neutral position. An oil line is provided to supply hydraulic oil from the hydraulic pump 51 to electromagnetic shift control valves VF for controlling the shift cylinder PF.

Figure 8:
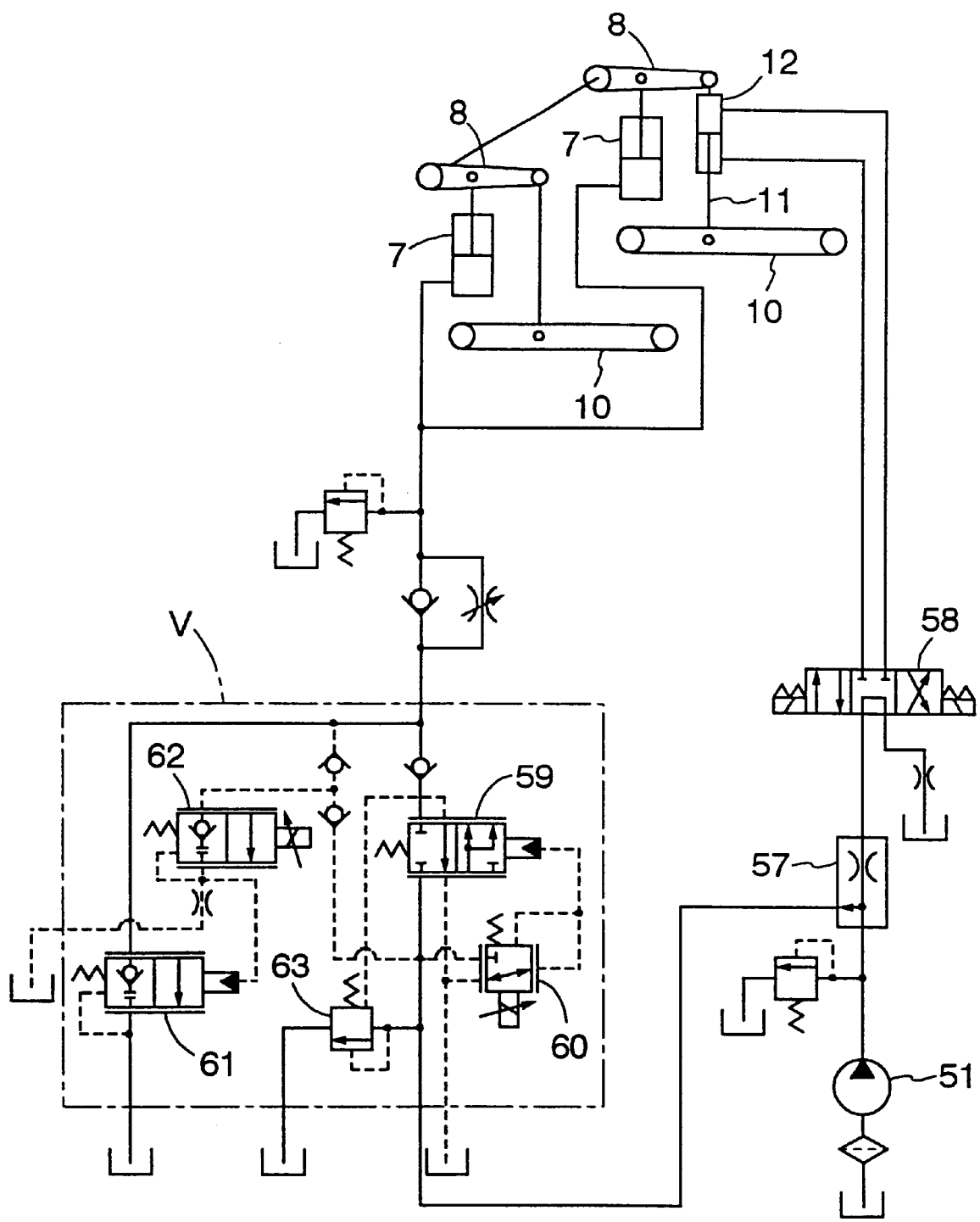
FIG. 8 is a hydraulic circuit diagram for lifting and rolling.

As shown in FIG. 8, a hydraulic system is constructed for enabling the lift control and rolling control of rotary plow A. Specifically, a flow priority valve 57 is mounted on an oil line for receiving hydraulic oil from the hydraulic pump 51. An electromagnetic rolling valve 58 is mounted on an oil line for transmitting control oil from the flow priority valve 57 to control the hydraulic oil to the rolling cylinder 12. An electromagnetic proportional control valve V is mounted on an oil line for transmitting surplus oil from the flow priority valve 57 to control the hydraulic oil to the lift cylinders 7. The electromagnetic proportional control valve V includes a raising valve 59 disposed in a position for supplying hydraulic oil to the lift cylinders 7, a pilot pressure controlling, raising pilot valve 60 for operating the raising valve 59, a lowering valve 61 disposed in a position for draining hydraulic oil from the lift cylinders 7, a pilot pressure controlling, lowering pilot valve 62 for operating the lowering valve 61, and a relief valve 63. The raising pilot valve 60 and lowering pilot valve 62 are constructed for adjusting opening degrees of the raising valve 59 and lowering valve 61 by varying pilot pressure through adjustment of the current value of control electric power applied to electromagnetic solenoids. By adjusting the opening degrees, a raising speed and lowering speed of the rotary plow A may be set as desired.

Figure 4:
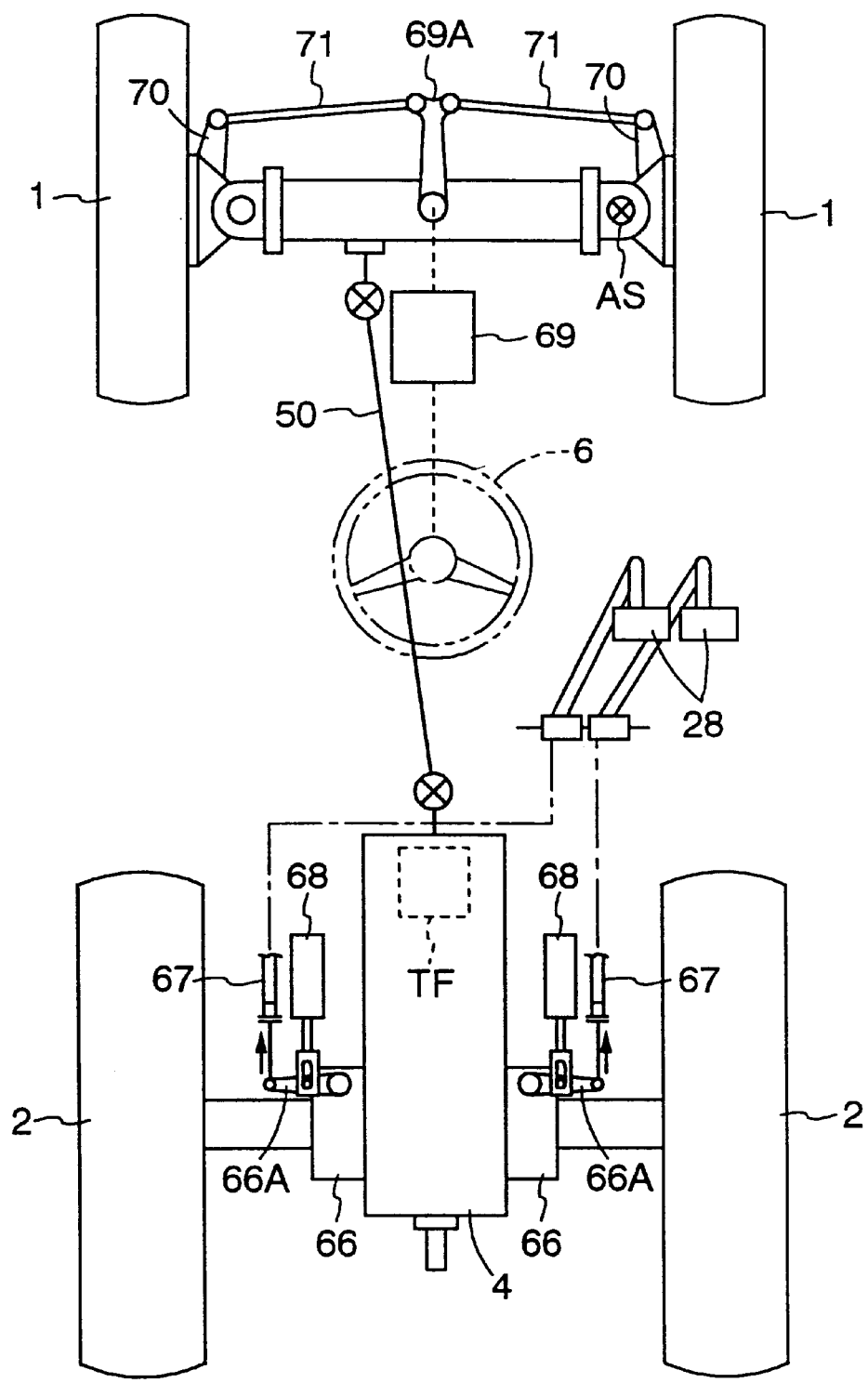
FIG. 4 is a plan view schematically showing a steering system and a braking system.

As shown in FIG. 4, side brakes 66 are disposed on transmission shaft lines for transmitting power from the transmission case 4 to the right and left rear wheels 2. These right and left side brakes 66 are operable by arms 66A interlocked to the side brake pedals 28 through linkages 67 such as control rods and control wires to be operable independently of each other by depression of the pedals. Further, hydraulic brake cylinders 68 are provided to control the right and left side brake 66 independently of each other.

As shown in the same figure, a steering control system includes a hydraulically operable power steering unit 69 for receiving an operating force of the steering wheel 6. Tie rods 71 are provided between a pitman arm 69A of power steering unit 69 and knuckle arms 70 of right and left front wheels 1. A steering angle sensor AS of the potentiometer type is provided for measuring a steering angle of the front wheels 1 from an amount of pivotal movement of a knuckle arm 71.

Figure 9:
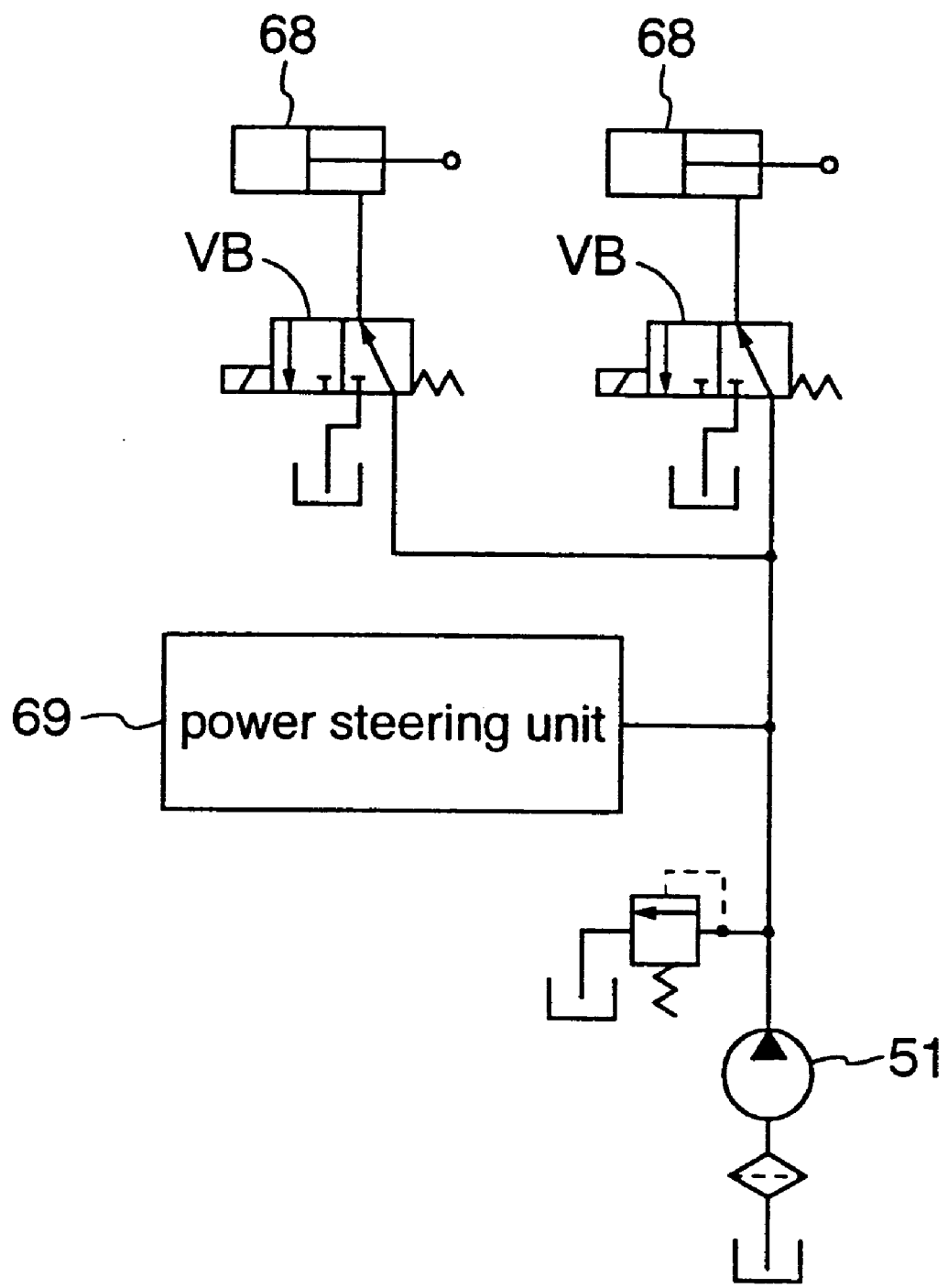
FIG. 9 is a hydraulic circuit diagram for braking.

As shown in FIG. 9, oil lines are provided for supplying hydraulic oil from the hydraulic pump 51 to the power steering unit 69, and to electromagnetic brake valves VB for controlling the right and left brake cylinders 68.

Figure 11:
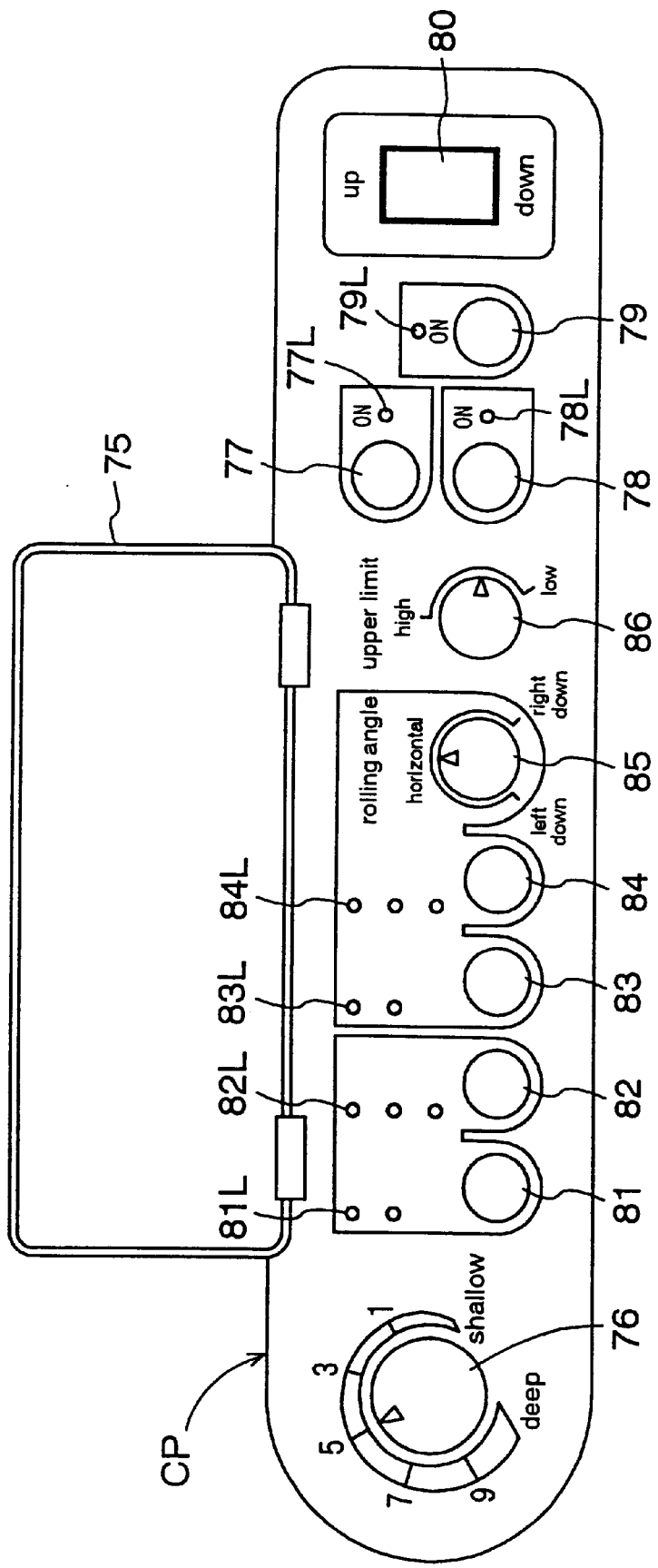
FIG. 11 is a plan view of a control panel.

As shown in FIG. 11, the control panel CP has an open/close lid 75 disposed on an intermediate portion thereof. A plowing depth setting dial 76 is disposed in a position exposed forwardly of the lid 75 when the lid 75 is closed. In a position exposed rearwardly of the lid 75 are a set of a switch 77 and a lamp 77L for auto up ON/OFF, a set of a switch 78 and a lamp 78L for backup control ON/OFF, a set of a switch 79 and a lamp 79L for ON/OFF en bloc of an automatic plowing depth control of standard sensitivity and a standard rolling control, and a manual rolling switch 80.

The portion covered by the lid 75 includes a set of a link specification select switch 81 and two lamps 81L for correcting a control reference value according to the specifications of the three point link mechanism L; a set of a plowing depth control mode select switch 82 and three lamps 82L for selecting one of a standard automatic plowing depth control which sets sensitivity to a standard, a sensitive automatic plowing depth control which sets sensitivity to high, and an engine load plowing depth control based on an engine load; a set of a rolling control mode switch 83 and two lamps 83L for selecting a standard rolling control or a rolling control for a sloping ground; a set of a rotary specification select switch 84 and three lamps 84L for correcting a control reference value according to the specifications of the rotary plow A; a rolling angle setting dial 85; and an upper limit setting dial 86. The lamps forming the sets with the above switches are lit when the switch are turned on or to indicate modes selected by the switches.

Figure 12:
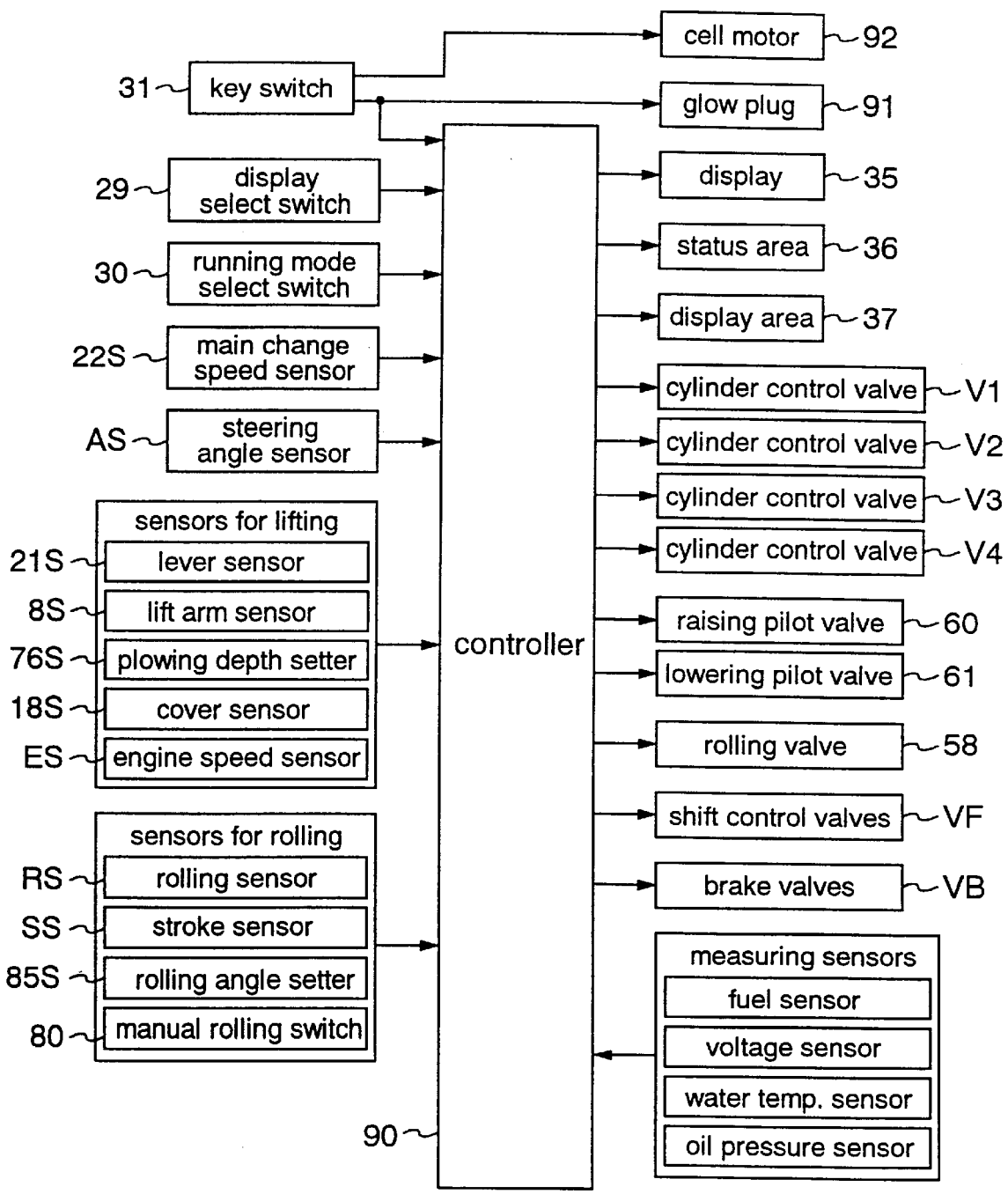
FIG. 12 is a diagram of a control system.

FIG. 12 shows a control system including the controller 90 which has a microprocessor. A display controller is included in this controller 90. The display controller includes a display mode selecting device for selecting a display mode, built therein in the form of hardware and software.

The key switch 31 has power lines for driving a glow plug 91 and a cell motor 92. A line is provided to input a signal to controller 90 from the line through which the key switch 31 drives the glow plug. The controller 90 has an input interface for receiving signals from the display select switch 29, running mode select switch 30, a main shift sensor 22S of the potentiometer type for detecting a control position of the main shift lever 22, sensors for lifting, sensors for rolling, steering angle sensor AS and measuring sensors; and an output interface for transmitting control signals to the display 35, status area 36, display area 37, cylinder control valves V1, V2, V3 and V4, raising and lowering pilot valves 60 and 61, rolling valve 58, shift control valves VF and brake valves VB.

The sensors for lifting include a lever sensor 21S for detecting a control position of the position lever 21, lift arm sensor 8S, a plowing depth setter 76S operable by the plowing depth setting dial 76, cover sensor 18S, and a speed sensor ES for measuring a speed of engine E. The sensors for rolling includes the rolling sensor RS, stroke sensor SS, a rolling angle setter 85S operable by the rolling angle setting dial 85, and manual rolling switch 80.

The measuring sensors include a fuel sensor for measuring the quantity of fuel remaining in a fuel tank, a voltage sensor for measuring battery voltage, a cooling water temperature sensor for measuring the temperature of cooling water of engine E, an oil pressure sensor (not shown) for measuring the pressure of engine oil.

The main shift lever 22 is operable to a parking position, a neutral position, 12 forward speed positions and 8 backward speed positions. When the main shift lever 22 is operated, the controller 90 detects a speed stage based on the signal from main shift sensor 22S, and provide a change speed state corresponding to this speed stage by selecting which of the hydraulic cylinders P1–P4 should be driven, and selecting and energizing the cylinder control valve or valves corresponding to the hydraulic cylinder or cylinders selected. Regarding the main change speed mechanism TM, the first change speed mechanism T1 can provide four speeds, while the second change speed mechanism T2 can provide two speeds. In addition, the third change speed mechanism T3 can provide two speeds. Thus, 16 speeds are available for forward running. However, a setting is made by software to provide only 12 speeds, with no shifting operation taking place in a range of small gear ratios.

The running mode select switch 30 may be pressed repeatedly to select successively the "2WD" mode, "4WD" mode, "double-speed" mode and "AD double-speed" mode. When each mode is selected, the controller 90 turns on the corresponding lamp for "4WD", "doublespeed" or "AD double-speed" in the status area 36. When the "2WD" mode is selected, the controller 90 controls the shift control valves VF to place the front wheel change speed device TF in neutral for breaking power transmission to the front wheels 1. When the "4WD" mode is selected, the shift control valves VF are controlled to set the front wheel change speed device TF to the state for transmitting power to the front wheels 1 at a drive speed to cause the front wheels to rotate at the same peripheral speed as the rear wheels 2. When the "double-speed" mode is selected, and provided that the signal from the steering angle sensor AS indicates the steering angle of front wheels 1 being less than the predetermined angle, the shift control valves VF are controlled to set the front wheel change speed device TF to the state for transmitting power to the front wheels 1 at the drive speed to cause the front wheels to rotate at the same peripheral speed as the rear wheels 2. On the other hand, if the signal from the steering angle sensor AS indicates that the steering angle of front wheels 1 exceeds the predetermined angle, the shift control valves VF are controlled to set the front wheel change speed device TF to the state for transmitting power to the front wheels 1 at a drive speed to cause the front wheels to rotate at a higher peripheral speed than the rear wheels 2. Further, when the "AD double-speed" mode is selected, and provided that the signal from the steering angle sensor AS indicates the steering angle of front wheels 1 being less than the predetermined angle, as when the "double-speed" mode is selected, the shift control valves VF are controlled to set the front wheel change speed device TF to the state for transmitting power to the front wheels 1 at the drive speed to cause the front wheels to rotate at the same peripheral speed as the rear wheels 2. On the other hand, if the signal from the steering angle sensor AS indicates that the steering angle of front wheels 1 exceeds the predetermined angle, the shift control valves VF are controlled to set the front wheel change speed device TF to the state for transmitting power to the front wheels 1 at the drive speed to cause the front wheels to rotate at a higher peripheral speed than the rear wheels 2, and at the same time the brake valve VB corresponding to the rear wheel 2 inwardly of the turn is controlled to operate the side brake 66 of the inward rear wheel 2.

Control modes for raising and lowering the rotary plow A will be described next.

[Position Control]

The position control is a control for setting and maintaining the rotary plow A at a target height relative to the tractor body. To effect this control, the operator sets the position lever 21 to a selected position, whereby the signal value from the lever sensor 21S indicates a control target. A signal is outputted to the electromagnetic proportional control valve V for operating the lift cylinders 7 to raise or lower the rotary plow A, so that the lift arm sensor 8S measure a signal corresponding to this target height. When the rotary plow A reaches the target height, the raising or lowering operation is stopped.

[Auto Plowing Depth Control]

Figure 6A:
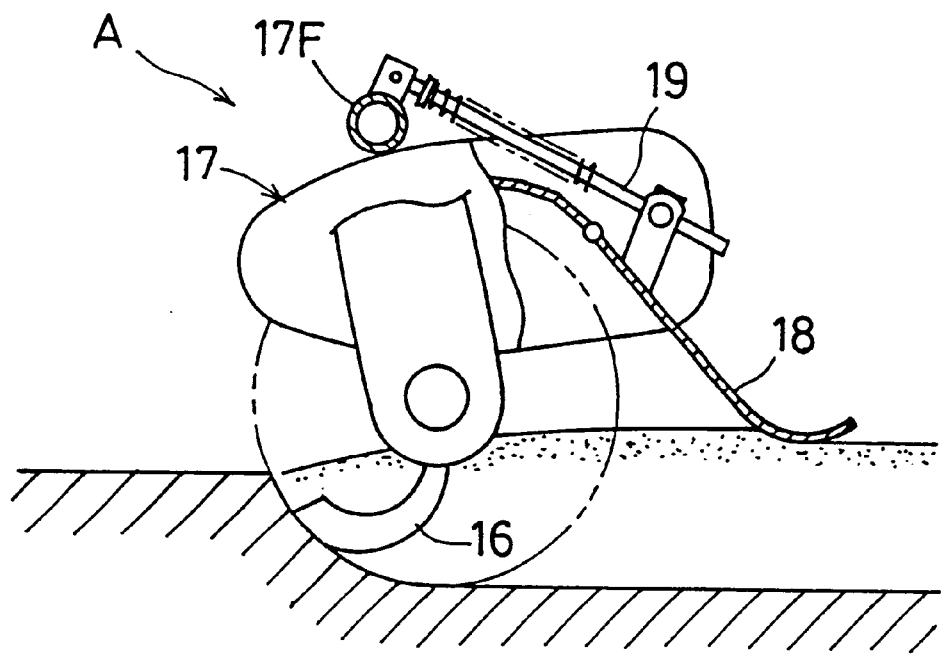
FIGS. 6a and 6b is a view showing two different postures of a rear cover of a rotary plow.
Figure 6B:
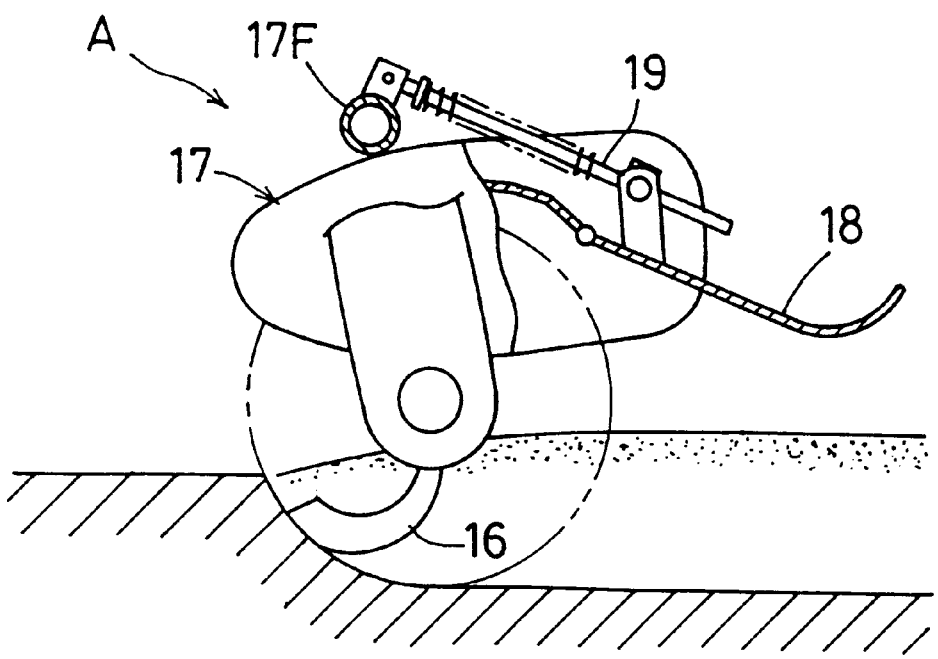

The auto plowing depth control is a raising and lowering control for maintaining the rotary plow A at a target plowing depth with reference to the ground. To effect this control, the plowing depth mode select switch 82 is operated to select the standard or sensitive auto plowing depth control mode. The rear cover 18 is placed in a freely pivotable state as shown in FIG. 6A. The plowing depth setting dial 76 is set to a target plowing depth. Then, the position lever 21 is set to a position for maximum depth to set the signal value from the plowing depth setter 76S to a control target. A signal is outputted to the electromagnetic proportional control valve V to raise or lower the rotary plow A, so that the signal from the cover sensor 18S be maintained at the control target. This control automatically raises or lowers the rotary plow A to maintain the rotary plow A at a target height relative to the ground even when the wheels sink into the ground or when the tractor body pitches.

[Engine Load Control] (E Auto)

The engine load control is a control for maintaining the rotary plow A at a target plowing depth with reference to the ground, and raising and lowering the rotary plow A to maintain the rotational frequency of engine E occurring at this target height. To effect this control, the plowing depth mode select switch 82 is operated to select the engine load plowing depth control mode. The rods 19 are manipulated to set the rear cover 18 to the raised state shown in FIG. 6B. With the plowing depth setter 76S set to a target plowing depth, the position lever 21 is set to the position for maximum depth. As a result, a pivoting angle of lift arms 8 corresponding to the signal value from the plowing depth setter 76S is derived. This pivoting angle is set as a control target. A signal is outputted to the electromagnetic proportional control valve V to raise or lower the rotary plow A, so that the signal value from the plowing depth setter 76S be maintained at the control target. The engine speed sensor ES measures the rotational frequency of engine E occurring at the time the rotary plow A is maintained at the level corresponding to the control target. This measurement is stored in memory. In this way, a control is carried out for automatically raising or lowering the rotary plow A in a direction to maintain the engine speed against variations in the load acting on the engine E which may occur when the wheels sink into the ground or when the tractor body pitches.

[Forcible Lift Control]

The forcible lift control includes a control for raising the rotary plow A to the upper limit, overriding the controls for raising and lowering the rotary plow A, and a control for lowering the rotary plow A back to a height selected or existing before this raising control. For raising the rotary plow A, the forcible lift lever 26 is operated upward, whereby a signal is outputted to the electromagnetic proportional control valve V to raise the rotary plow A until the lift arm sensor 8S measures a value of control target set by the upper limit setting dial 86. After this raising operation, the forcible lift lever 26 is operated downward to return to a preceding control mode, whereby the lowering control is performed to reinstate the former level.

[Backup Control]

The backup control is a control for raising the rotary plow A to the upper limit when, with the rotary plow A lying in a level other than the upper limit, the backward and forward drive change lever 24 is set to a backward position. This control is effected only if the backup switch 78 is kept ON. When the control is performed, a signal is outputted to the electromagnetic proportional control valve V to raise the rotary plow A until the lift arm sensor 8S measures the value of control target set by the upper limit setting dial 86. After this raising operation, the forcible lift lever 26 is operated downward to return to a preceding control mode, whereby the lowering control is performed to reinstate the former level.

[Auto Up Control]

The auto up control is a control for raising the rotary plow A to the upper limit when, with the rotary plow A undergoing the auto plowing depth control or engine load control, the front wheels 1 are steered in excess of the predetermined angle. This control is effected only if the auto up switch 77 is kept ON. When the control is performed, a signal is outputted to the electromagnetic proportional control valve V to raise the rotary plow A until the lift arm sensor 8S measures the value of control target set by the upper limit setting dial 86. After this raising operation, the forcible lift lever 26 is operated downward to return to a preceding control mode, whereby the lowering control is performed to reinstate the former level.

This tractor is capable of a rolling control for maintaining rotary plow A in a selected rolling posture when the tractor body rolls. This rolling control is effecting by keeping ON the switch 79 for ON/OFF en bloc of the automatic plowing depth control of standard sensitivity and a standard rolling control. When the tractor body tilts sideways, a target amount of operation of the rolling cylinder 12 is computed from a signal from the rolling sensor RS and a signal value set by the rolling angle setter 85S. A signal is outputted to the electromagnetic proportional control valve V to extend or contract the rolling cylinder 12 until the stroke sensor 22 measures this target value. With the rolling angle setter 85S set to a horizontal position, a control is performed to maintain the rotary plow A in horizontal posture even when the tractor body rolls. When the manual rolling switch 80 is pressed, this rolling control is overridden by a control to roll the rotary plow A in a selected direction, and upon release of this switch, the original rolling control is reinstated.

The rolling control mode switch 83 is used for causing the tractor to run along a contour line on a sloping ground, and is basically similar to the standard rolling control. However, a target inclination angle is automatically corrected to anticipate sinking of the wheels on the downhill side of a sloping ground.

Next, details of information shown on the display will be described.

The display 35 is used to present messages in the form of characters and graphics. In time of a normal operation, as shown in FIG. 13, the display 35 shows, in a right-hand region thereof, a remaining quantity of fuel and temperature of cooling water in bar graphs extending parallel and one above the other. In a leftward end region of the display, a speed stage provided by the propelling transmission system is shown in numerals or letters. The middle region between these two regions shows an integrated value of operating time, a value indicating a trip value of travel distance, or a value indicating a running speed. What should be displayed in the middle region may be selected by turning on the select switch 30. (These displays are called the standard displays.) FIG. 13 shows three display types. The upper display type shows that the main shift lever 22 is set to a parking position to render parking brakes operative. The middle display type shows the main shift lever 22 being in neutral position. The lower display type shows that the main shift lever 22 is set to the third speed stage.

When the key switch 31 is operated to electrify the glow plug 91 in order to start the engine E, the upper display type is employed from among the three display types shown in FIG. 14. A symbol of glow plug 91 appears in the left end region of display 35 for showing speeds. The right-hand region of display 35 shows the remaining quantity of fuel and temperature of cooling water as noted above. The middle region shows a selected numerical value.

Next, immediately after start of engine E, a message "Fasten seat belt" appears over the entire surface of display 35 for about three seconds, as shown in the display type in the middle of FIG. 14, unless the seat belt straps 20 are connected. When, upon start of engine E, the signal from the cover sensor 18S indicates that the rear cover 18 is raised, a message "E-auto and auto OFF" is given as shown in the lower display type in FIG. 14. This message is shown to notify the operator that the automatic plowing depth control mode is impossible while the rear cover 18 is in the raised state.

When abnormal situations occur while in the standard display mode noted above during an operation, the display 35 shows the following alarms over the entire surface thereof.

Figure 15:
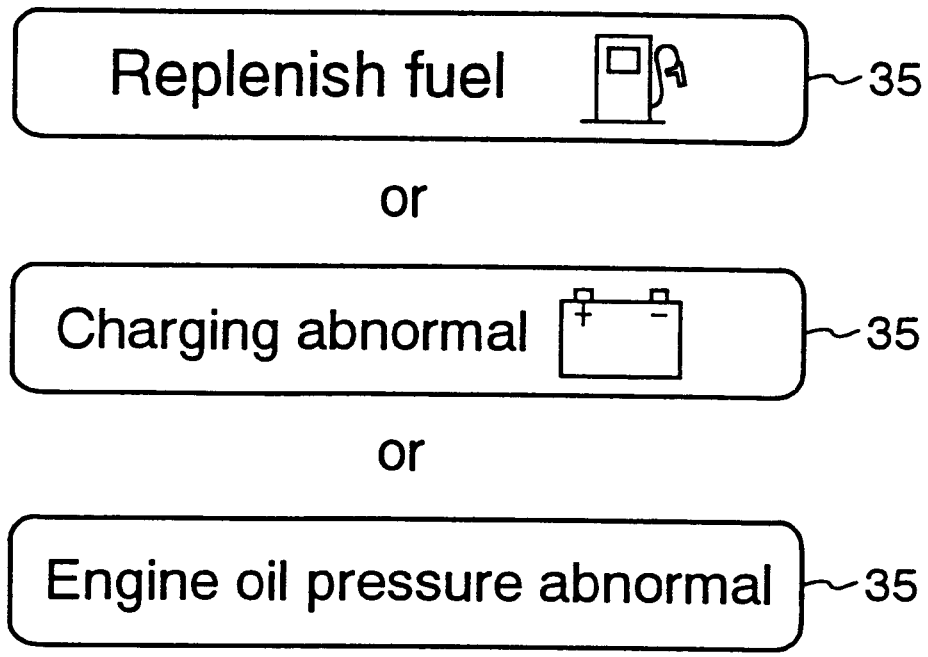
FIG. 15 is a view showing three types of display made in time of abnormality.

As an alarm display, when the fuel sensor detects the remaining quantity of fuel being less than a predetermined quantity, a message "Replenish fuel" and a symbol of refilling are displayed as shown in the upper display type in FIG. 15. When the voltage sensor measures the voltage of a battery (not shown) to be low, a message "Charging abnormal" and a battery symbol are displayed as shown in the middle display type in FIG. 15. When the oil pressure sensor detects a low engine oil pressure, a message "Engine oil pressure abnormal" is displayed as shown in the lower display type in FIG. 15.

Figure 16:
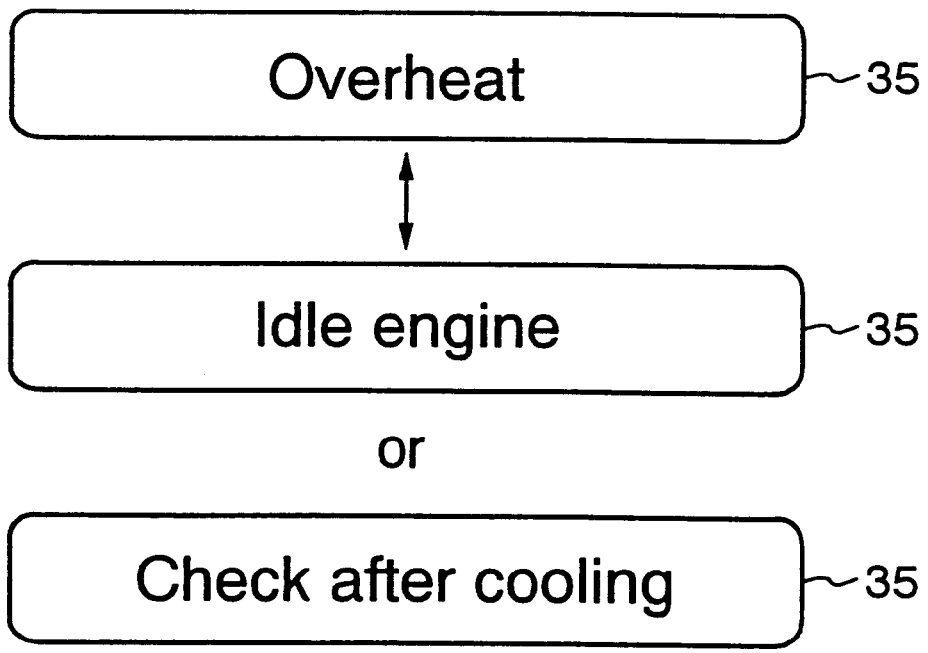
FIG. 16 is a view showing three types of display made in time of overheating.

When the cooling water temperature sensor measures the temperature of cooling water to be above a predetermined temperature, a message "Overheat" and a message "Idle engine" are alternately displayed as shown in FIG. 16. When the temperature of cooling water lowers to the predetermined temperature, the above messages are replaced by a message "Check after cooling".

When, in the standard display mode, a signal from a sensor shows an abnormal value, or when a short circuit or disconnection of the electromagnetic solenoid of the electromagnetic valve is detected, alarms are given on the entire surface of display 35 as described hereinafter. It is to be noted that the following devices are used for detecting a short circuit or disconnection of the electromagnetic solenoid. Where a current value applied to the electromagnetic solenoid is fed back for controlling the current, a short-circuit or disconnection is detected based on a signal from the feedback line. Where no feedback is employed, an additional sensor is used and a short-circuit or disconnection is detected based on a signal from this sensor.

Figure 17:
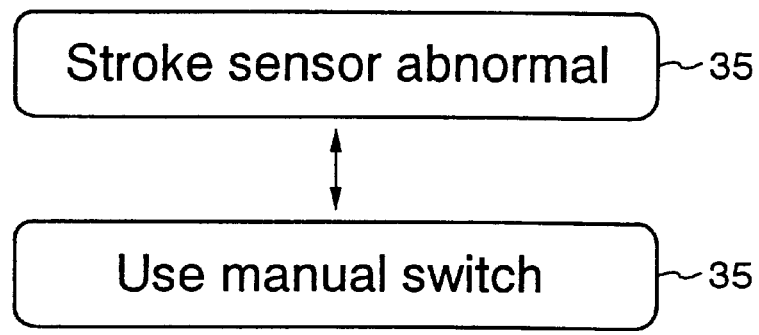
FIG. 17 view showing two types of display made in time of stroke sensor normality.
Figure 18:
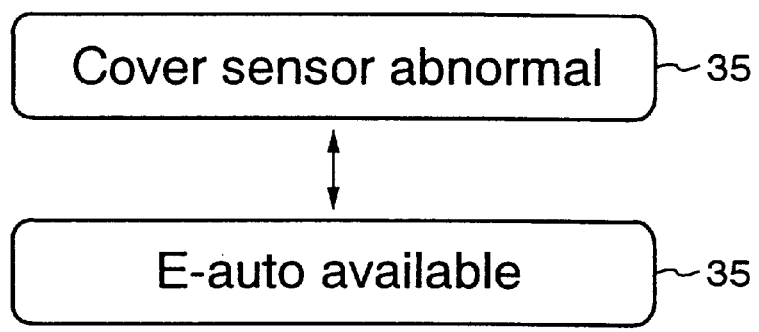
FIG. 18 is a view showing two types of display made in time of cover sensor abnormality.

Some examples of these displays will be cited hereunder. When an abnormality occurs with the stroke sensor SS, as shown in FIG. 17, a message "Stroke sensor abnormal" and a message "Use manual switch" appear alternately at intervals of 1.5 seconds. These displays notify the operator that an abnormality has occurred with the stroke sensor, and at the same time that an adjustment of the roll posture of rotary plow A may, if necessary, be carried out by operating the manual rolling switch. When an abnormality occurs with the cover sensor 18S, as shown in FIG. 18, a message "Cover sensor abnormal" and a message "E auto available" appear alternately at intervals of 1.5 seconds. These displays notify the operator that an abnormality has occurred with the cover sensor 18S, and at the same time that a lift control may be carried out by E auto.

Figure 19:
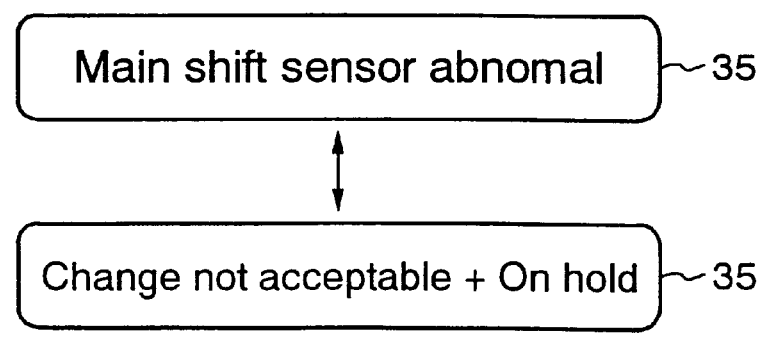
FIG. 19 is a view showing two types of display made in time of main change speed sensor abnormality.
Figure 20:
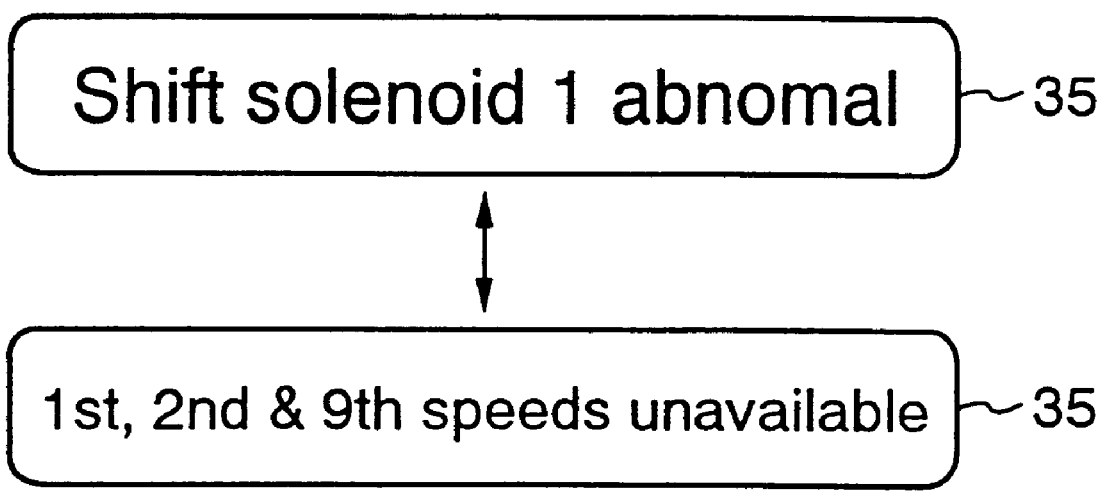
FIG. 20 is a view showing two types of display made in time of shift solenoid abnormality.
Figure 21:
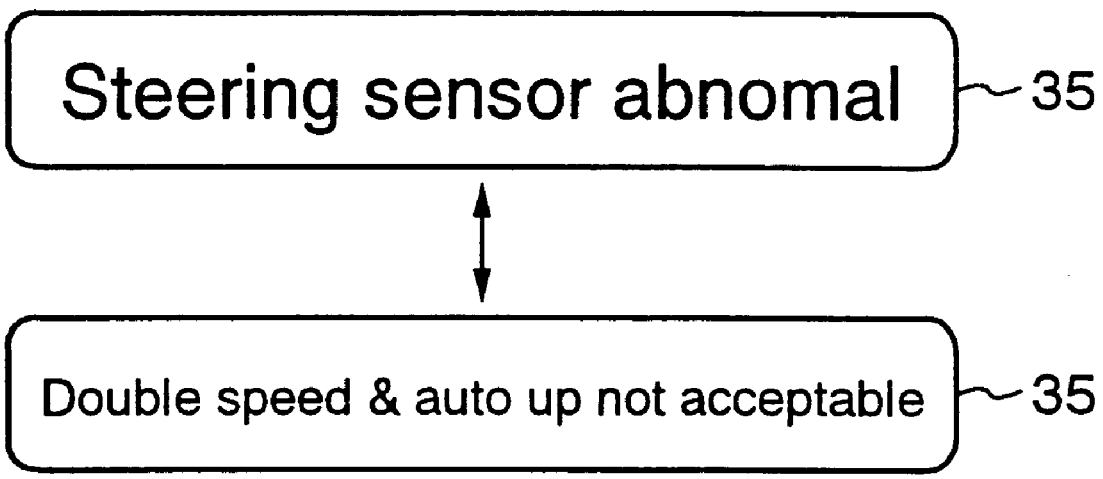
FIG. 21 is a view showing two types of display made in time of steering angle sensor abnormality.

When an abnormality occurs with the main shift sensor 22S, as shown in FIG. 19, a message "Main shift sensor abnormal" and a message "Change not acceptable +On hold" appear alternately at intervals of 1.5 seconds. These displays notify the operator that an abnormality has occurred with the main shift sensor 22S, and at the same time that a shifting operation is impossible and the current speed is maintained. When an abnormality occurs with the solenoid of cylinder control valve V1, as shown in FIG. 20 a message "Shift solenoid 1 abnormal" and a message "1st, 2nd & 9th speeds unavailable" appear alternately at intervals of 1.5 seconds. These displays notify the operator that an abnormality has occurred with the cylinder control valve V1, and at the same time that some of the speeds cannot be provided. When an abnormality occurs with the steering angle sensor AS, as shown in FIG. 21, a message "Steering angle sensor abnormal" and a message "Double-speed & auto up not acceptable" appear alternately at intervals of 1.5 seconds. These displays notify the operator that an abnormality has occurred with the steering angle sensor AS, and at the same time that the control in the double-speed mode and the auto up control are impossible.

During a usual operation, as described above, the display 35 is maintained in the standard display mode for continuously displaying information necessary to the operation. Based on this displayed information, the operation may be carried out with ease. In time of abnormality, the standard display mode is overridden by specific messages of abnormality shown on the entire surface of display 35 for causing the operator to recognize the abnormality. Where a message is given to indicate how to deal with the abnormally, the operator can take a proper step promptly. It is to be noted that the above standard displays and alarm displays constitute the contents of display made in an ordinary display mode.

In addition, this tractor is capable of displaying on the entire surface of display 35, information in an adjusting mode for making fine adjustment of the sensors, and information in a diagnostic mode for checking conditions of the sensors and the solenoids of the electromagnetic valves. For performing controls in the adjusting mode or diagnostic mode, for example, it is necessary to set the key switch to a power supply position, with the display select switch 29 and running mode select switch 30 turned on at the same time. When this operation is carried out, as shown at #a in FIG. 22, the display 35 shows three messages "fine adjust", "diagnosis" and "select model", and a selected one of the messages in inverse and blinks. This display may be switched successively by turning on the display select switch 29. A selection may be finalized by keeping the display select switch 29 on for two seconds or more. The "select model" is used in making settings corresponding to types of vehicles and working implements attached thereto, and will not be described herein.

Figure 22:
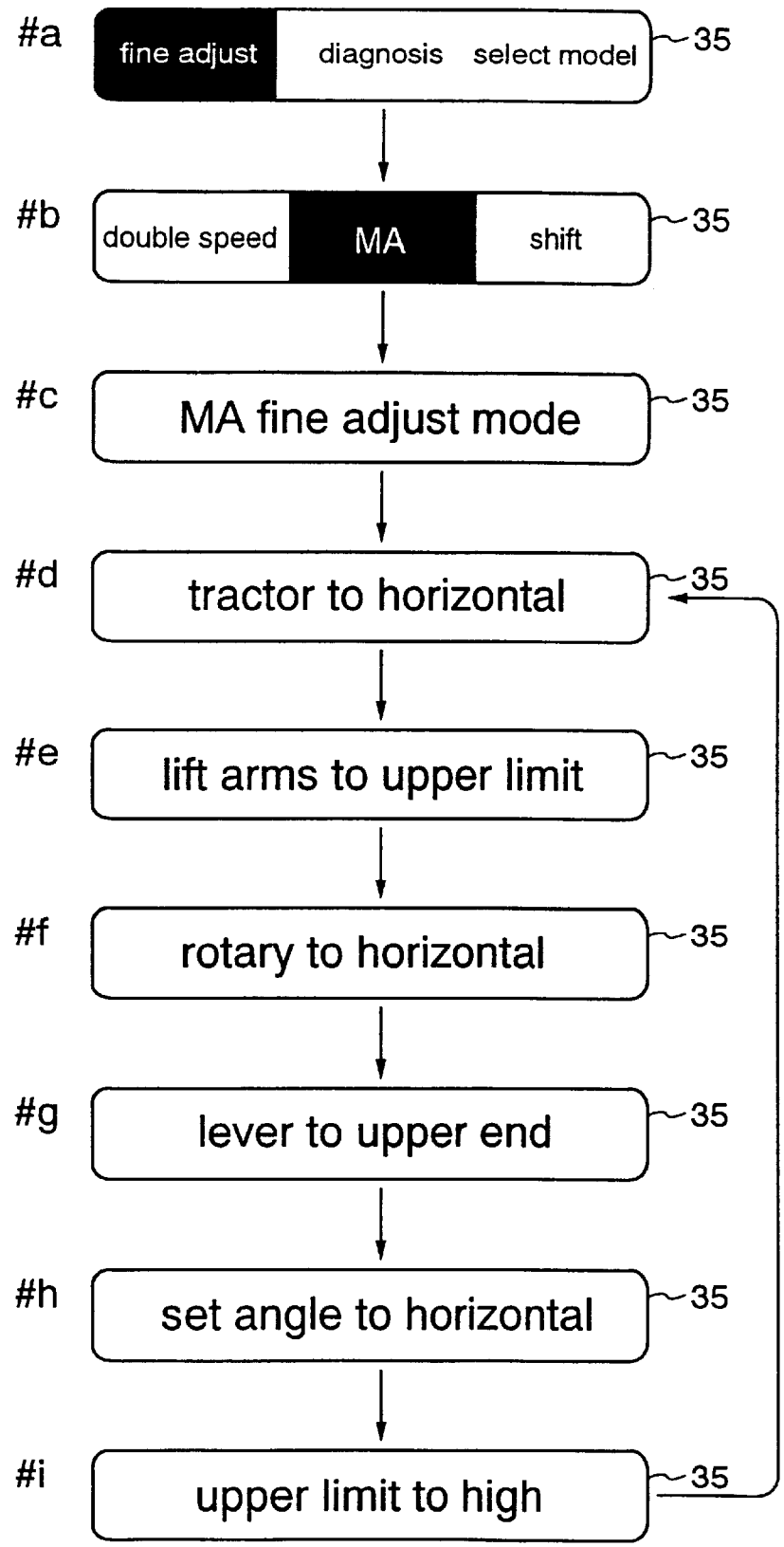
FIG. 22 is a view showing eight types of display made in time of fine adjustment mode selection.

When "fine adjust" (adjusting mode for fine-adjusting the sensors) is selected, as shown at #b in FIG. 22, the display 35 shows three messages "double speed", "MA" and "shift", and a selected one of the messages in inverse and blinks. This display may be switched successively by turning on the display select switch 29. A selection may be finalized by keeping the display select switch 29 on for two seconds or more.

When "MA" is selected, as shown at #c in FIG. 22, a message "MA fine adjust mode" is displayed first, and then, as shown at #d in FIG. 22, a message "tractor to horizontal" is displayed to prompt the operator to make the rolling posture of the tractor body horizontal. Next, a message "lift arms to upper limit" is displayed, as shown at #e in FIG. 22, to prompt the operator to raise the lift arms 8 to the upper limit. Next, a message "rotary to horizontal" is displayed, as shown at #f in FIG. 22, to prompt the operator to make the rolling posture of rotary plow A horizontal. Next, a message "lever to upper end" is displayed, as shown at #g in FIG. 22, to prompt the operator to operate the position lever 21 to a upper limit position. Next, a message "set angle to horizontal" is displayed, as shown at #h in FIG. 22, to prompt the operator to operate the rolling angle setting dial 85 to a "horizontal" position. Next, a message "upper limit to high" is displayed, as shown at #i in FIG. 22, to prompt the operator to operate the the upper limit setting dial 86 to a "high" position. The displays at #d to #i in FIG. 22 are repeated in the state order at intervals of 1.5 seconds. Where the settings prompted by these messages are or have already been made, the corresponding displays are not displayed again. Only messages for outstanding steps are repeatedly displayed.

Figure 23:
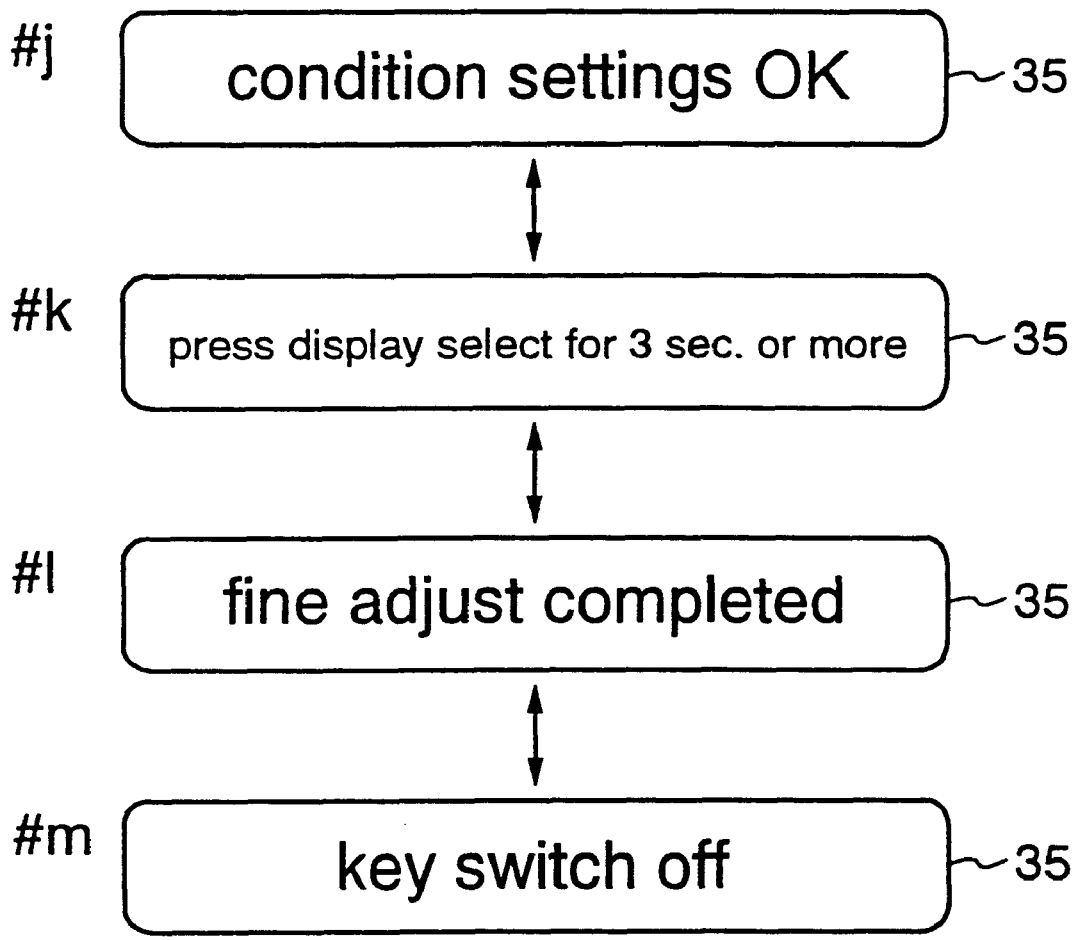
FIG. 23 is view showing five types of display made in time of fine adjustment mode selection.

When all these steps have been taken, a message "condition settings OK" indicating that all the settings are completed, and a message "press display select for 3 sec. or more" prompting the operator to press the display select switch 29, as shown at #j and #k in FIG. 23, are repeatedly displayed at intervals of 1.5 seconds. When the display select switch 29 has been pressed for three seconds or more as prompted by the display, signals are inputted from the rolling sensor RS, lift arm sensor 8S, cover sensor 18S, stroke sensor SS, lever sensor 21S, rolling angle setter 85S and upper limit setter 86S. Differences between the signal values and ideal values are stored as correction values in a nonvolatile memory such as an EEPROM. Subsequent controls may be corrected based on these correction values. When the above operation has been completed, a message "fine adjustment completed" indicating completion of fine adjustment, and a message "key switch off" prompting the operator to turn off the switch 31, are displayed as shown at #1 and #m in FIG. 23. The controls are completed by turning off the key switch 31 as prompted.

Further, for performing a diagnosis of the sensors and the like also, it is necessary to set the key switch to the power supply position with the two switches turned on at the same time. When this operation is carried out, as shown at #a in FIG. 24, the display 35 shows the three messages "fine adjust", "diagnosis" and "select model". The "diagnosis" is selected, and then "double speed" is selected from among the three messages "double speed", "MA" and "shift" as shown at #b in FIG. 24.

Figure 24:
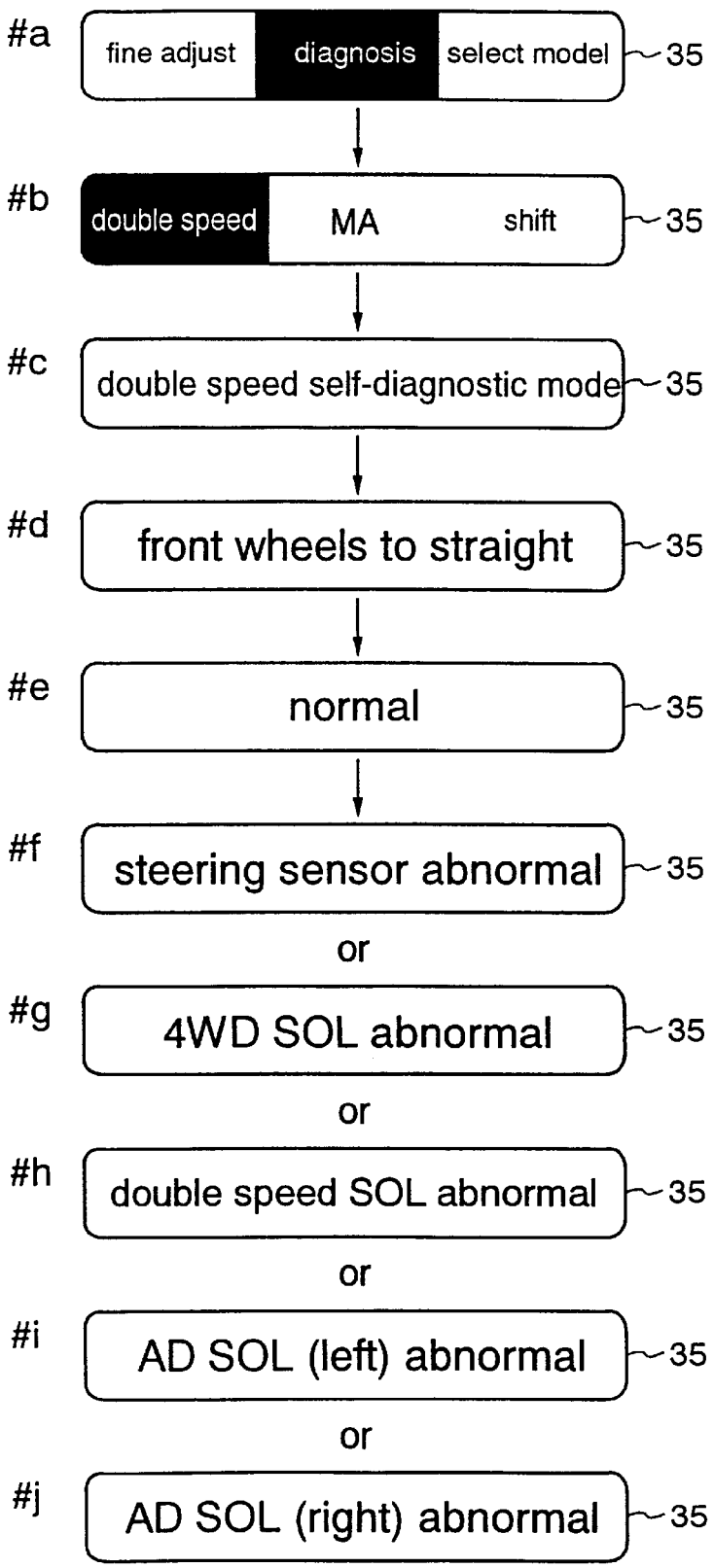
FIG. 24 is a view showing five types of display made in time of self-diagnosis mode selection.

When "double speed" is selected, as shown at #c in FIG. 24, a message "double speed self-diagnostic mode" is displayed first, and then, as shown at #d in FIG. 24, a message "front wheels to straight" is displayed to prompt the operator to turn the front wheels straight. At the same time, a diagnosis is performed to check the sensors and solenoids of electromagnetic valves used in the "double speed" and "AD double speed". When they are found normal, a message "normal" is displayed as shown at #e in FIG. 24.

When the self-diagnosis finds the steering sensor AS abnormal, a message "steering sensor abnormal" is displayed as shown at #f in FIG. 24. When, among the shift control valves, the one for providing 4WD is found abnormal, a message "4WD SOL abnormal" is displayed as shown at #g in FIG. 24. When, among the shift control valves, the one for providing double speed is found abnormal, a message "double speed SOL abnormal" is displayed as shown at #h in FIG. 24. When the left brake valve is found abnormal, a message "AD SOL (left) abnormal" is displayed as shown at #i in FIG. 24. When the right brake valve is found abnormal, a message "AD SOL (right) abnormal" is displayed as shown at #j in FIG. 24.

As described above, this invention utilizes the display 35 disposed on the tractor body to show information necessary to an operation, including a remaining quantity of fuel, a temperature of cooling water, speeds and so on. Immediately after a start of engine E, the operator is prompted to fasten the seat belt 20 and confirm the plowing depth control mode. In addition, when any of the numerous sensors and solenoids of the electromagnetic valves breaks down during an operation, the display 35 is used to show immediately the occurrence of abnormality and abnormal component on the entire surface thereof. Necessary steps and alternative control modes are displayed to enable the operator to take proper action with ease.

Further, when setting values for correcting the sensors, messages prompting to take necessary steps are shown on the display 35 simply by selecting an object or objects to be fine-adjusted after selecting the fine adjust mode. A proper operation may be carried out only by following the information displayed. When checking for faults of the sensors, messages prompting to take necessary steps are shown on the display 35 simply by selecting an object or objects for self-diagnosis after selecting the self-diagnostic mode. Results of the self-diagnosis are displayed subsequently. When an abnormality is found, the abnormal component is indicated. That is, necessary information may be confirmed on the display 35 during an operation, and an abnormality, if any, may be shown on the display 35 to immediately notify the operator of the situation and enable the operator to take appropriate action. The operator may adjust the sensors properly, based on information shown on the display 35, without referring to manuals. Thus, when checking the sensors, the operator may readily grasp correct information shown on the display 35, to make adjustment or determine whether certain sensors need to be changed. Although the key switch 31 for starting the engine is used to start the adjust mode and diagnostic mode, the controls in the adjust mode or diagnostic mode never take place when the engine E is started for an actual operation. Thus, the operator is free from troublesomeness concerning the display.

This invention is not limited to the embodiment described hereinbefore. Controls in the self-diagnostic mode, for example, may be set such that potentiometer type sensors are selected and an actual voltage value of each sensor is shown on the display.

What is claimed is:

1. A display control system for a working vehicle comprising:

a plurality of sensors arranged on a vehicle body;

a display located on the vehicle body for displaying messages relating to various information;

a display controller operable in response to information from said sensors for selecting information to be displayed in said display, wherein said display controller has an ordinary display mode for displaying, on said display during an operation, information necessary to the operation, an adjusting mode for displaying, on said display during a non-operation time, information for correcting signals from said sensors, the information including messages for operations to be carried out by an operator wherein in said adjusting mode, messages for plural types of operations to be carried out by the operator are displayed in a predetermined order on said display, said messages being excluded after the operations are determined to have been carried out properly, based on signals from said sensors, said messages being displayed again when the operations are determined not to have been carried out properly, based on signals from said sensors, and a diagnostic mode for displaying, on said display during a non-operation time, information for checking the signals from said sensors, the information including messages related to the sensors diagnosed; and a display mode selecting means for selecting one of said three display modes according a state of said working vehicle.

2. The system as defined in claim 1, wherein:

in said ordinary display mode, at least one of remaining fuel information and engine cooling water temperature information is displayed as a standard display on said display; and when said sensors detect an abnormality in time of said standard display, said standard display is overridden by messages corresponding to said abnormality to be displayed as an alarm display on said display.

3. The system as defined in claim 1, wherein, in said diagnostic mode, when a signal from one of said sensors diagnosed shows an abnormal value, a message indicating said one of said sensors diagnosed to be abnormal or a signal value from said one of said sensors is displayed on said display.

4. The system as defined in claim 1, wherein one of said adjusting mode and said diagnostic mode is selectable by operating an engine starting switch to a power supply position with a plurality of working switches turned on.

5. The system as defined in claim 1, wherein the display is located centrally on the vehicle body.

6. The system as defined in claim 5, wherein the display is located on a panel disposed forwardly of a steering wheel.

7. A display control system for a working vehicle comprising:

a plurality of sensors arranged on a vehicle body;

a display located on the vehicle body for displaying messages relating to various information;

a display controller operable in response to information from said sensors for selecting information to be displayed in said display, wherein said display controller has an ordinary display mode for displaying, on said display during an operation, information necessary to the operation, an adjusting mode for displaying, on said display during a non-operation time, information for correcting signals from said sensors, the information including messages for operations to be carried out by an operator, and a diagnostic mode for displaying on said display during a non-operation time, information for checking the signals from said sensors, the information including messages related to the sensors diagnosed, wherein in said diagnostic mode, when a signal from one of said sensors diagnosed shows an abnormal value, a message indicating said one of said sensors to be abnormal or a signal value from one of said sensors is displayed on said display; and a display mode selecting means for selecting one of said three display modes according a state of said working vehicle.

8. The system as defined in claim 7, wherein the display is located centrally on the vehicle body.

9. The system as defined in claim 8, wherein the display is located on a panel disposed forwardly of a steering wheel.

10. The system as defined in claim 7, wherein:

in said ordinary display mode, at least one of remaining fuel information and engine cooling water temperature information is displayed as a standard display on said display; and when said sensors detect an abnormality in time of said standard display, said standard display is overridden by messages corresponding to said abnormality to be displayed as an alarm display on said display.

11. The system as defined in claim 7, wherein one of said adjusting mode and said diagnostic mode is selectable by operating an engine starting switch to a power supply position with a plurality of working switches turned on.

\* \* \* \* \*

UNITED STATES PATENT AND TRADEMARK OFFICE
CERTIFICATE OF CORRECTION

PATENT NO. : 6,320,497 B1  
DATED : November 20, 2001  
INVENTOR(S) : Toshiya Fukumoto et al.

It is certified that error appears in the above-identified patent and that said Letters Patent is hereby corrected as shown below:

<u>Column 4,</u>  
Line 5, "FIG. 17 view" should read -- FIG. 17 is a view --.  
Line 6, "normality" should read -- abnormality --.  
Line 18, "FIG. 23 is view" should read -- FIG. 23 is a view --.

Signed and Sealed this

Twenty-seventh Day of August, 2002

*Attest:*

JAMES E. ROGAN  
*Attesting Officer*  *Director of the United States Patent and Trademark Office*